United States Patent
Kuhara et al.

(10) Patent No.: US 6,530,698 B1
(45) Date of Patent: Mar. 11, 2003

(54) OPTICAL DEVICE

(75) Inventors: Yoshiki Kuhara, Osaka (JP); Hiromi Nakanishi, Osaka (JP); Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 136 days.

(21) Appl. No.: 09/612,232

(22) Filed: Jul. 7, 2000

(30) Foreign Application Priority Data

Jul. 9, 1999 (JP) .......................................... 11-196468

(51) Int. Cl.[7] .............................. G02B 6/00; G02B 6/36
(52) U.S. Cl. .......................................... 385/88; 359/163
(58) Field of Search ............................. 385/37, 24, 88, 385/49, 89, 93, 14, 56, 47, 90; 369/44.12, 109, 112, 113; 359/163

(56) References Cited

U.S. PATENT DOCUMENTS

| | | | | |
|---|---|---|---|---|
| 5,105,403 A | * | 4/1992 | Kando et al. | 369/112.14 |
| 5,546,212 A | * | 8/1996 | Kunikane et al. | 359/163 |
| 5,787,215 A | * | 7/1998 | Kuhara et al. | 359/115 |
| 6,318,908 B1 | * | 11/2001 | Nakanishi et al. | 385/89 |

FOREIGN PATENT DOCUMENTS

| | | | |
|---|---|---|---|
| JP | 60176003 | 9/1985 | |
| JP | 60176003 | * 10/1985 | .................. 385/88 |
| JP | 04074483 | 3/1992 | |
| JP | 05088041 | 4/1993 | |
| JP | 05088041 | * 9/1993 | .................. 385/88 |
| JP | 07181343 | 7/1995 | |
| JP | 11119064 | 4/1999 | |

OTHER PUBLICATIONS

JP, IEIC C–3–63, Nishikawa, et al., Mar. 1997.
JP, IEIC C–3–66, Sasaki, et al., 1997.
JP, IEIC C–3–66, Hirai, et al., 1997.
JP, IEIC C–3–62, Ishii, et al., 1997.
JP, IEIC C–3–68, Yoshida, et al., 1997.

* cited by examiner

Primary Examiner—Akm E. Ullah
(74) Attorney, Agent, or Firm—Smith, Gambrell & Russell, LLP

(57) ABSTRACT

A device including a fiber/waveguide and a optical device (PD, LD or so). The end of an optical fiber or a light waveguide is cut slantingly. A transparent resin of a refractive index akin to the fiber/waveguide encloses the fiber/waveguide, the optical device and a space between them. The slanting end cutting and the transparent resin cooperate with each other to annihilate the reflection, returning light perfectly without reducing the coupling coefficient.

4 Claims, 20 Drawing Sheets

Embodiment 1, 2

PLC type

Embodiment 1, 2

Embodiment 1, 2 relation between the slanting cut angle and the ORL

◆ 1.00  △ 1.40
□ 1.37  ○ 1.50
● 1.56

Embodiment 3

Embodiment 3

Embodiment 4

Embodiment 5

Embodiment 6

Embodiment 9

Embodiment 9

Embodiment 10

Embodiment 11

Embodiment 12

Embodiment 12

Embodiment 12

Embodiment 12

Embodiment 13

Embodiment 14

OPTICAL DEVICE

BACKGROUND OF THE INVENTION

1. Field of the Invention

This invention relates to an optical device for an optical transmitting device, an optical receiving device, an optical transmitting/receiving device or other optical parts for constructing same and an assembly of the devices for optical communication. This invention, in particular, aims at reducing the ORL (Optical Reflection Loss).

This application claims the priority of Japanese Patent Application No.11-196468 (196468/1999) filed Jul. 9, 1999 which is incorporated herein by reference.

2. Description of Related Art

Practical development of optical communication accelerates miniaturization and cost-reduction of optical transmitting devices, optical receiving devices or so. Recent endeavors are made for investigating very tiny optical devices called PLC (planar lightwave circuit) type which makes use of passive alignment. For example, the followings suggested PLC devices.

1̂ T. Nishikawa, Y. Inaba, G. Tomon, T. Uno, Y. Matsui, "Surface Mounting LD Module on a Silicon Substrate", 1997 IEIC C-3-63, p248(1997).

2̂ Jun-ichi Sasaki, Masataka Itoh, Hiroyuki Yamazaki, Masayuki Yamaguchi,"Si bench for highly efficient optical coupling using passively-aligned spot-size converter integrated laser diode", 1997 IEIC C-3-65, p250(1997).

3̂ A. Hirai, R. Kaku, T. Maezawa, K. Takayama, T. Harada, "Silicon V-Groove Substrate for Optical Modules", 1997 IEIC C-3-66, p251(1997).

FIG. 1 and FIG. 2 show prior PLC type optical receiving modules (PD module). FIG. 1 is a plan view of the PLC type PD module and FIG. 2 is a sectional of the same module. An optical receiving module (PD module) 1 has an Si bench 2 including a lower step 4 and a higher step 3. The higher step 3 sustains an end of a fiber 9 and the lower step 4 holds a PD 5. The PD 5 is a waveguide type PD which has an light sensing waveguide 12. The light going into the PD from the side is sensed by the waveguide 12. The Si-bench 2 has a smaller V-groove 7 and a bigger V-groove 6 made by anisotropic etching on the upper step 3. A ferrule 8 and the fiber 9 are supported in the V-grooves 6 and 7. The ferrule 8 encloses an end of the fiber 9. The ferrule 8 can be attached to or detached from an external optical device (not shown in FIGS. 1 and 2). The end surface of the fiber 9 is orthogonal to the central optical axis. Outgoing light 11 from an end 10 passes a narrow gap and reaches the light sensing waveguide 12 of the PD 5. The fiber is also fixed to the same Si-bench 2. Mounting both the fiber and the PD on the same Si-bench enables the PD module to reduce its size. There is no joint requiring alignment. No alignment (passive alignment) alleviates the fabrication time and the cost. The omission of a lens reduces the cost also. Then, the PLC type PD module of FIG. 1 and FIG. 2 would be a cheap, miniaturized PD module.

The prior art of FIG. 1 and FIG. 2 disposes optical devices (PD 5, ferrule 8 and optical fiber 9) on t he Si-bench 2 for joining the fiber directly to the light sensing device (photodiode; PD 5) without lens. The butting joint between the fiber and the PD allows the PD module to decrease parts and reduce the size, which would lead to a low-cost PD module. Here the optical fiber 9 is shown as a light introducing part by way of example. A light waveguide can be employed instead of the fiber 9. The waveguide type PD which allows the incidence light to enter the side as an example. The side incidence waveguide type can also be replaced by a top incidence type PD or a bottom incidence type PD in accordance with the design of the optical system.

The V-grooves 6 and 7 are formed by anisotropic etching based on photolithography on an Si wafer. The positioning marks are formed also by photolithography on the Si wafer for predetermining the spot of a PD on a bench. The V-grooves and the positioning mark enable the module to place the fiber and the PD at exactly predetermined positions. The rigorous positioning by the grooves and the marks without positive alignment is called "passive alignment". The passive alignment allows the PLC module denoted by FIG. 1 or FIG. 2 to reduce the assembling cost. The PLC module has advantages of low part cost and low assembling cost.

The end of the fiber is orthogonal to the light axis. The orthogonality is considered to be indispensable to the passive alignment. If the end surface were to be oblique to the light axis, the beam emanating from the fiber would bend sideward and would require a time-consuming positive alignment for coupling with the PD. It is a common sense that the passive alignment should inherently request the orthogonal end of the fiber.

As a matter of fact, the reflection at the fiber end causes a problem in the PLC prior art of FIG. 1 and FIG. 2. The end 10 of the fiber is cut in a plane vertical to the light propagating direction (axial direction). Another end of the fiber faces an LD (laser diode) as a light source (not shown in the figures). The vertical end reflects the laser light backward. The reflected beam propagates in the fiber in the reverse direction to the LD and induces instability of the LD oscillation. The LD makes use of mirror surfaces of both ends for reciprocating light as a resonator. If the light reflected at the fiber end returned to the LD, the LD would have two resonators. The existence of two resonators changes the oscillation wavelength or the frequency and the power. The instability would incur inconveniences. The returning light should be fully suppressed for maintaining the stability of the laser oscillation-wavelength and power. The light receiving surface of the PD which is coated with an antireflection film does not reflect the LD light. But the fiber end which is not coated with the antireflection film would cause the serious problem by reflecting the laser light.

The light which is reflected by the fiber end and is returned to the LD is called "reflection returning light" here. The light emanating from the LD is called "input light". The rate of the reflection returning light to the input light is called ORL (Optical Reflection Loss).

$$ORL = 10 \log(P_r/P_{in})(\text{dB}). \qquad (1)$$

Here, log means logarithm, $P_r$ is the light power which is reflected at the fiber end and is returned to the LD and $P_{in}$ is the light power which is produced by the LD and is progressing to the fiber end. ORL is defined in a unit of dB. Since $P_r$ is always smaller than $P_{in}(P_r<P_{in})$, ORL is negative. ORL is a measure of the influence of the returning light to the LD. Smaller ORL is better for the PD module. Too big ORL is a drawback of the prior art of FIG. 1 and FIG. 2. The ORL of the PLC module is now calculated.

The power reflection rate $R_{ef}$ at an interface from a medium of a refractive index $n_1$ to another medium of a refractive index $n_a$ is denoted by $$R_{ef} = \{(n_1-n_a)/(n_1+n_a)\}^2. \qquad (2)$$

In the case of the prior PD module shown by FIG. 1 and FIG. 2, light goes out from a quartz fiber of a refractive index $n_1=1.46$ to air of a refractive index $n_a=1.00$. The returning light is ORL=−14.6 dB which is a large value. Namely, the reflected light is strong. The large difference of refractive index between the fiber and air leads to such a big ORL.

How small ORL is required for practical PD modules? The requirements and characteristics depend upon the kinds of optical communication systems. The allowable maximum ORL is contingent upon the systems. More sophisticated system requires a smaller ORL. An optical receiving device requires a small ORL of less than −27 dB. The fabrication margin is about −3 dB. Then, less than −30 dB is required for the ORL in practice. This is why the laser is perturbed even by small reflection returning light.

Furthermore, transmission of multichannel analog signals, e.g., optical CATV, requires a very small ORL of less than −40 dB. This is a very rigorous requirement itself It is yet not sufficient that the ORL is less than −40 dB at a certain temperature. The scope of temperature in which optical modules should operate regularly ranges from −40° C. to +85° C. The ORL should be less than −40 dB in whole the temperature range from −40° C. to +85° C. This is a quite rigorous condition.

The suggested PLC of FIG. 1 and FIG. 2 cannot satisfy the requirement, since ORL=−14.6 dB. The PD module of FIG. 1 and FIG. 2 has poor utility due to the large reflection returning light. The application of the prior PD module is narrowly restricted within transmission of digital signals with a slow rate in few channels. Trials have been done for reducing ORL far lower than the prior art.

FIG. 3 and FIG. 4 show a contrivance filling the space between the fiber 5 and the PD 5 with a transparent resin 14 having a refractive index nearly equal to the fiber for reducing the reflection loss at the fiber end. The occupying resin which is called a "potting resin" alleviates the reflection loss at the fiber end. For example, the following documents suggested the prior art of FIG. 3 and FIG. 4.

4̂ T. Ishii, S. Eguchi, K. Yoshida, T. Kato, K. Fukuda, T. Ishikawa, "Pigtail Type Optical Module by Transfer Molding", 1997 IEIC C-3-62, p247 (1997).

5̂ K. Yoshida, T. Kato, T. Hirataka, F. Yuuki, K. Tatsuno, T. Miura, "Optical Coupling Properties of LD module using resin molding", 1997 IEIC C-3-68, p253 (1997).

6̂ Kazuyoshi Hasegawa, Masayuki Kubota, Japanese Patent No.2792722, "Semiconductor Light Emitting Device".

Eq.(2) teaches us that the difference $(n_1-n_a)$ of the refractive index is the origin of reflection. Reduction of the refractive index difference $(n_1-n_a)$ decreases the reflection at the interface. In general, silicone-group resins or acrylate-group resins are sometimes used for potting (coating) electronics parts to protect the object parts from humidity or oxidization. In the prior art of FIG. 3 and FIG. 4, the purpose of filling the potting resin 14 between the PD and the fiber is not to protect the devices but to reduce the ORL. The conditions imposed upon the resin are transparency for signal light and refractive index similar to the fiber. The silicone-group resins or acrylate-group resins are transparent not only to visible light but also to 1.3 μm light and 1.55 μm light suitable for optical communication.

These transparent resins have refractive indexes akin to the optical fiber (1.46). For example, the silicone-group resins have a refractive index about n=1.4 at room temperature. The acrylate-group resins have a refractive index about n=1.5 at room temperature. At room temperature, by chance, both the silicone-group resins and the acrylate-group resins can satisfy the aforementioned requirement of the ORL less than −30 dB (ORL≦−30 dB). The PD module of FIG. 3 and FIG. 4 has a fiber end vertical to the light axis, because the module is made by passive alignment.

Refractive index of any resin has temperature dependence. Any existent resin material cannot satisfy the condition (ORL≦−30 dB) throughout the wide temperature range from −40° C. to +85° C. FIG. 5 is a graph showing the ORL of an acrylate-group resin (◇) and a silicone-group resin (●) as a function of temperature. The abscissa is temperature (°C.). The ordinate is ORL (dB). The silicone-group resins or the acrylate-group resins include some different species with different refractive indexes. FIG. 5 shows only an example belonging to the groups. In general, a rise of temperature reduces the ORL in the acrylate-group resin. A decrease of temperature reduces the ORL in the silicone-group resin. Both the resin groups cannot easily satisfy the condition (ORL≦−30 dB) throughout the temperature range from −40° C. to +85° C. Both resin groups cannot satisfy the more rigorous condition ORL≦−40 dB required for analog signals.

The change of the ORL depending on temperature is caused by the change of the refractive index as a function of temperature. In FIG. 5, the temperature dependence of the ORLs is contradictory between the silicone-group resin and the acrylate resin. The inverse change of the ORLs does not derive from the difference of the temperature tendency of the refractive indexes. On the contrary, the refractive indexes decrease with a rise of temperature both for the acrylate resin and the silicone resin. The silicone resin continually changes the refractive index from 1.48 to 1.37 in the temperature range from −40° C. to +85° C. The acrylate resin continuously changes the refractive index from 1.56 to 1.49 in the temperature range from −40° C. to +85° C. The refractive index of the fiber is 1.46. The silicone resin separates the refractive index farther from 1.46 (fiber) in a rise of temperature, which increases the ORL for the silicone resin. The acrylate resin pushes down the refractive index closer to 1.46 (fiber) in a rise of temperature, which decreases the ORL for the acrylate resin. There are resins which have a refractive index nearly equal to that of the quartz fiber. However, the change of temperature varies the ORL. The above explanation relates to the difficulty of coupling the fiber with the PD. The difficulty accompanies also the coupling of the light waveguide with the PD. In the case of the Si light waveguide, the reflection returning light disturbs the laser oscillation which causes malfunction of the optical devices.

The prior art PD module of FIG. 1 and FIG. 2 having an air gap has only an improvement of FIG. 3 and FIG. 4 of filling the air gap with the transparent resin as a remedy for protecting the LD from the reflection returning light. The transparent resin can reduce the reflection. But the temperature variation disturbs the function of the resin through the change of refractive index. Even if the resin-potting PD module partially could satisfy the ORL less than −30 dB in the full temperature range from −40° C. to +85° C., the resin-filled module cannot fulfill the severe, future requirement of the ORL less than −40 dB.

SUMMARY OF THE INVENTION

This invention proposes a coupling between a fiber (or a waveguide) and an optical device produced by cutting an end of the fiber (or the waveguide) slantingly and filling a gap with a transparent (potting) resin of a refractive index akin to the fiber (or the waveguide). The end of the fiber is not cut into an orthogonal surface to the axis but cut into a slanting surface. The fiber or the waveguide allows light to pass in a single way in a definite direction. The light axis can be defined by the fiber or the waveguide. The slanting angle α is defined as a deviation angle from the orthogonal plane.

The important matter is the slanting end surface and the potting resin for the present invention.

This invention features two means: slanting end and potting resin, for suppressing the reflection returning light. The cutting angle of the fiber end or the waveguide end should be about 2 degrees to 10 degrees. Preferable angle is 2 degrees to 8 degrees. The slanting cut of the end hinders the reflected light from returning back in the same fiber to the LD. The reflected light is extinguished at the end of the fiber or the waveguide. Furthermore, the encapsulation of the gap by the transparent resin of a refractive index akin to the fiber or waveguide alleviates the reflection itself The resin encapsulation is known in the PLC module as shown in FIG. 3 and FIG. 4. The slanting end is also well known in hermetic seal modules enclosed with metal package. But the combination of the resin encapsulation and the slanting end is quite novel in the PLC type modules.

This invention can be applied to various optical devices. Before many examples are explained, a typical example is first described for facilitating to understand the feature of the present invention. FIG. 6 and FIG. 7 denote an example (fiber+waveguide type PD) of the present invention. Like prior art modules of FIG. 1 to FIG. 4, a Si bench 2 has an upper step 3 and a lower step 4. The upper step 3 has a larger V-groove 6 and a smaller V-groove 7 made by anisotropic etching of the single crystal silicon bench 2. A ferrule 8 and a fiber 9 are fixed in the V-grooves 6 and 7. The ferrule 8 is a cylinder holding an end of the fiber 9 coaxially for allowing external parts to attach to or detach from the fiber. An inner end 16 of the fiber 9 is cut slantingly. The slanting angle ($\alpha$) is, for example, 4 degrees, 6 degrees, 8 degrees or so. A waveguide type PD 5 is mounted at a definite spot upon the lower step 4. Positioning marks denote the predetermined position of the PD 5. The end 16 of the slanting cut fiber is covered by a transparent potting resin 14 having a refractive index similar to the fiber. Covering solely the end is still effective. Preferably, the gap between the fiber end 16 and the receiving surface of the PD 5 should be fully covered with the potting resin 14.

This invention has the gist of cutting slantingly the end of the fiber in addition to the coating with the transparent resin. The slanting end cut has neither been done nor suggested till now in the field of the PLC technology. The slanting end cut is quite new in PLC modules. The slanting end has been, however, a commonplace in a neighboring field of technology of conventional metal can hermetic shielded devices. The conventional metal canned, three-dimensional devices make the best use of the slanting cut fiber end for suppressing the reflected light from returning to the LD. FIG. 8 shows a prior PD module hermetically shielded in a metal package.

The prior PD module has a metal round stem 20. The metal stem 20 has an insulating submount 21 at the center on the upper surface. A top-incidence type PD 22 is mounted upon the submount 21. Wirebonding connects a lead pin 31 to the submount 21 and a lead pin 33 to a PD top electrode with wires. A cylindrical cap 23 with a lens 24 is welded on the upper surface of the stem 20. A cylindrical sleeve 25 is fitted on the stem 20 for covering the cap 23. A ferrule 26 holding an end of an optical fiber 27 is inserted into an axial hole 28 of the sleeve 25. The lower end 30 of the fiber 27 and the ferrule 28 is polished in a slanting angle. A bend limiter 29 is capped on the sleeve 25 for preventing the fiber from bending excessively. Since the end of the fiber is cut slantingly, the outgoing beam is refracted to the left (toward the lower side of the slanting end). The outgoing beam does not fall along the axial direction but falls slantingly to the left. Then, the sleeve 25 is aligned by moving the sleeve 25 on the stem 20 two-dimensionally, observing the power sensed by the PD 22, searching the position and the rotation angle of the sleeve for obtaining the maximum power and welding the sleeve at the position. This is the horizontal alignment. Further, the ferrule 26 is positioned at an optimum depth by moving the ferrule 26 in the axial hole, measuring the power of the PD, determining the depth of the ferrule for obtaining the maximum power and welding the ferrule 26 to the sleeve 25. This is the vertical alignment. The alignment is indispensable for the metal packaged hermetic sealed PD module having the oblique fiber end. The alignment is difficult and time-consuming work, which raises the cost of optical devices.

The above device is sometimes called a coaxial type PD module, since it includes concentric parts (cap, lens, sleeve, ferrule, bend limiter) to the central light axis. The module has three dimensional structure in which the axial line meets at right angles to the PD chip. The example has a fiber end of a slanting angle of 8 degrees. The slanting end is a contrivance for prohibiting the light reflected at the end from going back through the fiber to the LD. The outgoing beam is refracted to the left and deviates to the left from the axial line. The lens and the PD do not exist on an extension of the fiber axial line but lie at spots deviating to the left from the extension. In fabricating such a three-dimensional device, the cap and the sleeve are two-dimensionally aligned and welded on the stem after bonding the PD on the stem. Such alignment allows the fiber end to be cut slantingly. Without alignment, the slant cut fiber end would not prohibited to the contrary. The alignment operation determines the optimum positions of the cap 23 (lens 24) and the sleeve 25 (fiber 27) with respect to the stem 20 for the PD to receive the maximum power from the fiber. The alignment enables the PD module to obtain high sensitivity and low ORL at the same time. The operation of monitoring the PD, displacing three-dimensionally the cap, the ferrule and the sleeve and seeking the optimum positions is called active alignment. Such time-consuming active alignment itself allows the slanting end cut of the fiber. If the parts were not aligned actively, the slanting cut end could not join the PD in a good condition. The active alignment is an antonym of the passive alignment of the PLC devices which would forbid the slanting cut of the fiber.

Such a PD module which requires time-consuming active alignment raises the production cost. The expensive PD module would be a hindrance for building inexpensive optical communication systems. Cheap PLC type devices shown in FIG. 1 to FIG. 4 are still desirable. The PLC type PD module of FIG. 1 to FIG. 4 dispenses with the time-consuming active alignment. Since the alignment is omitted, the positioning of the PLC is called "passive alignment". "Passive" alignment simply means "no" alignment. In the PLC module of FIG. 1 to FIG. 4 does not divert the PD from an extension of the fiber axis. Thus, the skilled persons have considered that there would be no room for including the step of cutting the fiber end obliquely in the production of the PLCs. In the PLC module, in the first place, the PD is made at the spot coinciding with an extension of the fiber central axial line. They consider that if the fiber end were cut slantingly, the light emanating from the fiber would bend sideways and would never go into the PD on the PLC module. Such a sturdy belief has severely forbidden the PLC to cut the fiber end obliquely.

The Inventors think otherwise. The Inventors consider that the oblique cut end will be still effective for the PLC type devices which refuse the active alignment. The slanting end cut will be effective even for the PLC devices as long as the transparent potting resin is used for covering the fiber end. Cooperation of the slanting end cut and the potting resin enables this invention to accomplish an unexpected effect.

The deviation angle by the refraction at the fiber end is explained by referring to FIG. 9 for clarifying the concept of the present invention. The refractive index of the fiber core is denoted by $n_1$. The refractive index of the outer medium (potting resin) is denoted by $n_a$. The central light axis determined by the fiber is designated by KMN. M is a middle point of the slanting end surface 16 of the fiber. The outlet surface 16 is not orthogonal but slanting by $\alpha$ to an orthogonal plane MC. Namely, $\angle DMC=\alpha$. NF is a normal standing on the slanting plane 16 at M. The normal MF inclines by $\alpha$ to the light axis MN. The fiber propagating beam KM is refracted at M into an outgoing beam MG. A beam reflected at M is denoted by MR. The reflected beam MR is important. The matter is whether the reflected beam MR returns to the LD or not. The refraction is complex but the reflection is simple. The inclination angle of the reflected beam MR to the light axis MK is simply $2\alpha$. Namely, $\angle KMR=2\alpha$.

The refraction is more complicated than the reflection. The inclination angle of MG to the normal MF is denoted by $\beta$. The beam MG deviated from the axial line MN at $\theta$. $\beta=\theta+\alpha$. To the refraction KMG, Snell's law gives a relation between $\alpha$ and $\beta$, $$n_1 \sin \alpha = n_a \sin \beta. \quad (3)$$

$\beta$ and $\theta$ are written as, $$\beta=\sin^{-1}(n_1 \sin \alpha/n_a), \quad (4)$$

$$\theta=\sin^{-1}(n_1 \sin \alpha/n_a)-\alpha. \quad (5)$$

$\theta$ is a deviation angle of the outgoing beam MG from the light axis MN. If $n_a$ were equal to $n_1(n_a=n_1)$, the deviation angle would be zero. The closer the medium refractive index $n_a$ approaches to the fiber refractive index $n_1$, the smaller the deviation angle $\theta$ reduces. On the contrary, the deviation angle $\theta$ increases as the medium refractive index $n_a$ separates farther from the fiber refractive index $n_1$.

The reflection angle is simply $\angle KMR=2\alpha$. Whether the reflection beam can become a propagation beam in the fiber depends upon a relation between the core refractive index and the cladding refractive index. The core refractive index is $n_1$. The cladding refractive index is $n_2$. Of course, $n_1>n_2$. A full reflection angle $\Psi$ is defined as a critical angle for the fiber. An inclination angle is defined as an angle between the beam line and the central axial line. The beams having an inclination angle of less than $\Psi$ can become a propagation beam in the fiber. The beams having an inclination angle of more than $\Psi$ escapes from the fiber and does not become a propagation beam. $\Psi$ is given by the full reflection condition at an interface between the core and the cladding. When the core beam is slanting by $\Psi$ to the normal standing on the interface, the refracted cladding beam goes just in the interface. Namely, Snell's law requires $n_1 \sin\{(\pi/2)-\Psi\}=n_2 \sin(\pi/2)$. $\sin\{(\pi/2)-\Psi\}=\cos \Psi$. Then, $$\cos \Psi = n_2/n_1. \quad (6)$$

Since the refractive indices of the core and the cladding are very close together, $\Psi$ is a small angle. A single-mode fiber has a quite small $\Psi$. In FIG. 9, the slanting angle of a reflected beam is $2\alpha$. If $2\alpha<\Psi$, the reflected light can become propagating light, because it is fully reflected at the interface. This is called a propagation mode. But if $2\alpha>\Psi$, the reflected light cannot become propagating light, because the light leaks into the cladding and dies away. This is called a dissipation mode. The explanation of the selection based on geometric optics is simple. Strictly speaking, the beam has variation of power distribution. The dynamics would be rigorously treated by wave optics. But the selection whether the reflected light would be a propagating mode or dissipating mode can be judged only by comparing $2\alpha$ with $\Psi$. The prior art of FIG. 1 to FIG. 4 having vertical ends chose $\alpha=0$. Thus, all the reflected light becomes the propagation mode. This invention gives a small definite value to $\Psi$ for annihilating the reflection light of $2\alpha>\Psi$. This invention preventing the reflected light of $2\alpha>\Psi$ from returning to the LD. The allowable lower limit of $\alpha$ is $\Psi/2=(1/2)\cos^{-1}(n_2/n_1)$.

The allowable lower limit is, for example, two degrees. In the case of a single mode fiber, $\Psi/2$ is less than 2 degrees. Thus, a slanting angle $\alpha$ more than 2 degrees can completely exclude the reflected light. Since the reflection is based upon the simple law, the problem of reflection is apt to be neglected by being occulted by refraction problems. The explanation hitherto relates to the concrete condition whether the reflected light can be returning light or not. The reflected returning light is the first important matter of the present invention.

Another problem is the refraction at the fiber end. For example, when light is emitted from an end of an optical fiber ($n_1=1.46$) into air ($n_a=1.00$), the refracted light will incline at 1.85 degrees from the light axis in the case of the slanting angle $\alpha=4°$. If the distance between the fiber end and the PD is 500 $\mu$m, the refracted beam would deviate sideways from the center of the PD by about 16 $\mu$m. Such a large deviation hinders the beam from entering the light receiving part of the PD. The waveguide type PD of FIG. 1 to FIG. 4 has about a 2 $\mu$m to 5 $\mu$m width of waveguide. The tolerance of the scope within a 1 dB sensitivity fall is a few micrometers ($\mu$m) for the waveguide type PD. The PD does not sense the 16 $\mu$m deviating beam at all. This calculation teaches us that the passive alignment is forbidden in the case of the outer medium of air ($n_a=1.00$).

The calculation was based upon the assumption of the 500 $\mu$m distance from the fiber to the PD. 500 $\mu$m was still a short fiber/PD distance. However, there is a margin for reducing the distance. The PD receiving power would be increased by shortening the fiber/PD distance. A 1 dB decrease corresponds to a few micrometer deviation. Suppression of the deviation of the beam from the light axis less than 3.2 $\mu$m would require an extremely short fiber/PD distance of L=100 $\mu$m. Such too short a distance would raise the difficulty of assembling the device. It is undesirable that the rotation of the fiber would vary the light power entering the PD. Instead of 4 degrees ($\alpha=4°$), if the slanting angle is 8 degrees ($\alpha=8°$), the deviation angle would rise to $\theta=3.72°$. Even if the fiber/PD distance were extremely shortened to L=100 $\mu$m, the deviation would be 6.5 $\mu$m at the surface of the PD. 6.5 $\mu$m is larger than the tolerance. Little light goes into the PD. Such a large deviation would deny the probability of passive alignment. If the PD should be positioned by active alignment in PLC devices, the active alignment would raise the difficulty of industrial production of the PLC devices. The above consideration seems to clarify the incompetence of a slanting fiber end for PLC devices. Perhaps no skilled person has tried to cut a fiber end slantingly for PLC devices for the reason. But the incompetence does not derive from the PLC itself but from the outer medium.

If a transparent potting resin of refractive index n=1.40 filled the light path between the fiber and the PD, the reflection itself would decrease conspicuously from Eq.(2). A decrease of reflection would induce a decline of returning light. A further important matter is that the inclination angle $2\alpha$ of the reflected light exceeds the full-reflection critical angle $\Psi$ and the reflected light can not be propagating light in the fiber. The reflected light becomes the dissipation mode. Since the light is rapidly dissipated in the fiber, the light cannot return to the LD. The returning light would be decreased to be nearly zero by two reasons. One is the potting resin coating. The other is the slanting cut end. Since no reflected light returns to the LD, the LD is fully immune from the operation instability. This is an important feature. In addition to the small reflection, the deviation $\theta$ of the refracted beam MG from the light axis MN is also quite small. This is another important feature. Coating of the fiber end with a potting resin of a refractive index akin to the fiber exhibits three strong points: decrease of reflection, conversion of reflection light to dissipation mode and decrease of beam deviation. The former two points decrease the returning light to zero. The last point gives the possibility of passive alignment to the slanting fiber end module. They are excellent features.

For example, when the fiber end is protected with the transparent resin of $n_a=1.40$, four degree slanting cut end ($\alpha=4°$) bends the refracted beam MG only slightly at $\theta=0.17°$ from the light axis MN which is far smaller than $1.85°$ for air (n=1.00). For instance, if the fiber-PD distance is L=500 $\mu$m, the deviation of the beam spot on the PD surface is only 1.5 $\mu$m. The 1.5 $\mu$m deviation is smaller than the 1 dB tolerance (2–3 $\mu$m). Otherwise if the fiber-PD distance is L=100 $\mu$m, the spot deviation is further reduced to 0.3 $\mu$m. Such a small deviation allows passive alignment for assembling the device. The potting resin enables the passive aligned PD module to introduce sufficient light from the oblique fiber end into the PD. Furthermore, the once entering light becomes propagating, effective light in the PD with little loss. For L=300 $\mu$m, the spot deviation is 1.9 $\mu$m which still allows the passive alignment.

The above explanation relates to the waveguide type PD which has a narrow tolerance for the spot deviation. A top incidence type PD with a top inlet or a bottom incidence type PD with a bottom entrance have wider tolerances for the beam spot deviation. However, the top incidence type or the bottom incidence type PDs require longer fiber-PD distance. The longer distance compensates the wider tolerance. The effect of the potting resin is nearly equivalent for the waveguide PD, the top incidence PD or the bottom incidence PD.

Another effect of the resin coating of the fiber end is the possibility of reduction of the slanting angle $\alpha$. A smaller oblique angle a can accomplish a similar ORL to the prior art having a larger slanting angle of air medium. The returning power, that is, the ORL is obtained by calculating the coefficient of the coupling of an obliquely-reflected and fiber-returning Gaussian beam to the LD. FIG. 10 shows a relation between the slanting angle and the ORL with a parameter of the resin refractive index. The abscissa is the slanting cut angle $\alpha$ (degree). The ordinate is the ORL (dB). The refraction index of the fiber is $n_1=1.46$. There is a parameter which is a refractive index of the medium enclosing the fiber end. The medium refractive index $n_a$ is assumed to be 1.00, 1.37, 1.40, 1.56 and 1.50. 1.00 is the air refractive index. Others are refractive indexes of resins. Four parameters do not signify to compare four different resins but to consider two aforementioned resins at two different temperatures.

The ORL is the largest for the air medium case ($n_a=1.00$) denoted by black lozenges. The second largest ORL is given by a resin having $n_a=1.56$, which is shown by black rounds. The $n_a=1.56$ resin case, even if the end is perpendicular ($\alpha=0$), the ORL takes a small value of −29 dB. The fall is caused by the enclosing resin having a refractive index akin to the fiber. The falls on the $\alpha=0$ line (ORL-axis) are all originated from the resin enclosure irrespective of the fiber end geometry.

An increase of the slanting angle $\alpha$ reduces the ORL. The reduction results from the decrease of the reflection. The reduction is common for all the media and all the refractive indexes.

The third largest ORL is given by a resin of a refractive index $n_a=1.37$, which is denoted by blank squares. The 0 slanting angel $\alpha=0$ gives −31 dB. The ORL falls as $\alpha$ increases.

Another refractive index $n_a=1.40$ further suppresses the ORL down to −34 dB at the 0 slanting angle. Blank triangles denote the ORL for $n_a=1.40$. A rise of a reduces the ORL. The lowest ORL is given by $n_a=1.50$, which is designated by blank rounds. The 0 slanting angle gives −37 dB of ORL. The ORL decreases in an order of the refractive indexes $n_a$ closing to the fiber refractive index (n=1.46).

Among the five refractive indexes, $n_a=1.50$ is the closest to the fiber index n=1.46. It is a matter of course, the resin of $n_a=1.50$ brings about the lowest ORL for all $\alpha$. The prior art of FIG. 3 and FIG. 4 tried to attenuate the reflection only by the action of the transparent potting resin. The declines of ORL only correspond to the falls on the ORL-axis from the black lozenges to other symbols of dots, which take all $\alpha=0°$. Unlike the FIG. 3 and FIG. 4 prior art, this invention makes the best use of the obliqueness of the fiber end which produces more effective falls of ORL. This invention denies $\alpha=0$ and proposes a slanting cut end $\alpha=2$ degrees to 10 degrees. For instance, $\alpha$ of 4 degrees enables the module to decrease the ORL by about −15 dB in comparison to $\alpha=0$. This is a conspicuous advantage of the present invention.

FIG. 10 implies that air (n=1.00) as medium would require the slanting angle $\alpha=4$ degrees for reducing the reflection till ORL$\leq$−30 dB. Air would further require $\alpha=6$ degrees for reducing to ORL$\leq$−40 dB. On the contrary, the transparent potting resin enables this invention to alleviate the request for the slanting angle $\alpha$. The minimum slanting angle 2 degrees ($\alpha=2°$) allows the resins of a refractive index from $n_a=1.37$ to $n_a=1.56$ to reduce the ORL till ORL$\leq$−30 dB in the full temperature range from −40° C. to +85° C. The 4 degree cut end ($\alpha=4°$) satisfies ORL$\leq$−40 dB.

The fall of ORL results from the decline of the reflection caused by a reduction of the difference of refractive index between the fiber and the medium. The reflection rate is 3.5% for air as a medium. The reflection is reduced to 0.11% for n=1.56. The reduction of the reflection is −15 dB. The resin coating induces such a reduction of reflection. The ORL is reduced by the same amount (−15 dB) as the reflection reduction. A fall of ORL is caused by a rising $\alpha$ and a closing $n_a$ to 1.46. The extra fall by the resin coating alleviates the request of the slanting angel $\alpha$ for satisfying ORL$\leq$−40 dB. The resin decreases the returning light by reducing the reflection. The reduction of reflection increases the signal light going into the PD. In this case, the PD entering light is enhanced by 3.5%. The potting resin has another effect of raising the coupling efficiency.

Experiments were carried out by making use of fibers having slanting cut ends of $\alpha=2$ degrees, 4 degrees and 6 degrees for confirming the result of the calculation. Similar values of ORL to the calculation of FIG. 10 are obtained in the experiments in both the case with the resin coating and the case without resin coating (n=1.00).

The present invention succeeds in reducing the ORL and diminishing the beam deviation from the light axis by cutting the fiber end obliquely and covering the end with a transparent resin. Small beam deviation allows the module to adopt the passive alignment. The present invention has advantages of low ORL, high coupling coefficient and possible passive alignment. The advantages enable the present invention to give low cost and high performance optical devices. The beam deviation (beam inclination) is so small that little attention should be paid to the direction of the slanting cut in assembling a fiber to the device. The small beam inclination dispenses with the rotation alignment of fibers. The feature facilitates the fabrication.

This invention can be applied widely to coupling between a general optical part and a fiber/waveguide. The coupling has different kinds of optical elements. One is a linear light guide for conveying light along a central axis. The linear light guide can define a central light axis which determines the propagation path of light. The linear light guide is a fiber or a waveguide.

The counterpart is an optical positive device which has some positive role. The counterpart optical part does not necessarily have an inherent light axis. The optical part is a PD in the above examples. But the optical part is not restricted to the PD. Instead of the PD, an LED or an LD can be a counterpart to the linear light guide. Other examples of the optical parts are a lens, a prism or a mirror. Namely, the linear light guides are an optical fiber and a waveguide. The optical parts are a PD, an LED, an LD, an APD, a mirror, a prism, a mirror or so.

This invention can be applied to a waveguide made on a substrate. When the optical part is an LD or an LED, the linear light guide (fiber or waveguide) carries transmitting light. In the case, the present invention reduces ORL. The ORL should be defined in a reverse relation. The ORL should be reduced also in the case for preventing instability of the LD. For instance, the case of an LD is explained by referring to FIG. 11. FIG. 11 shows a prior coupling between an LD 34 and a fiber 35 having a vertical end. The LD34 emits signal light 37 from a stripe 36. The signal light 37 goes into a fiber 35 as propagating light 38. A part of the light is reflected at the vertical end of the fiber. A reflected beam 39 returns to an end 43 of the LD 34 and induces instability in the LD. The instability is exhibited in FIG. 12 and FIG. 13. FIG. 12 shows the relation between the laser power and the driving current. The ideal case shows a linear relation. But FIG. 12 shows kinks appearing in the current/power curve as a deviation from the linear relation. FIG. 13 is an LD power spectrum having several oscillation lines. FIG. 13 shows two groups 40 and 41 of oscillation wavelengths, which invites two wavelength oscillation.

Thus, the reflected returning light is still a problem in the LD module of FIG. 11. Prior art tries to avoid the returning light by covering the path with a resin like FIG. 3 and FIG. 4. FIG. 14 shows a prior art LD module filling the gap with a transparent resin. Since a fiber end 44 is orthogonal to the beam axis, reflected light 39 returns to an LD 34, which causes oscillation instability. High power LDs producing light of more than 1 mW would be plagued by the instability induced by large reflection returning light which increases in high speed operation of more than 1 GHz. The reflection returning light increases in proportion to the laser power itself. The oscillation instability causes more serious influence upon higher speed operation. The returning light incurs an increase of noise, deformation of signals, incapability of long distance transmission or so. The reduction of the reflected returning light is earnestly requested, in particular, for DFB lasers (distributed feedback lasers) which have been utilized for high-speed, long-distance transmission.

The present invention prevents the reflected light from returning to an LD 34 by cutting obliquely an end 44 of a fiber 35 and filling the gap between the LD 34 and the fiber end 44 with a transparent potting resin 42, as shown in FIG. 15. The optics for reducing the returning light is similar to the aforementioned example of a PD module. The oblique end 44 reflects laser light 37 sideways into a sidelong beam 39. The resin 42 decreases the reflection, as Eq.(2) shows. The oblique end may invite an anxiety of a probable fall of the coupling efficiency. It matters little as explained afterward.

A question may emerge. Why do nobody hit an idea of the present invention? This invention is only a sum of two well known contrivances: slanting end cut and resin coating. Perhaps anybody has a sturdy, stale belief of, slanting end cut=beam deviation from the axis=requisite active alignment=impossible passive alignment.

The Inventors succeeded in putting the novel idea into practice both on theory and on experiment by conquering the sterile belief.

The key point of the present invention is the transparent resin. The essence of the problem, however, is the asymmetry between refraction and reflection. Both refraction and reflection are optical laws. But asymmetry discerns between refraction and reflection. The refraction angle depends upon the refractive index of media. The reflection angle is free from the refractive index of media. The refraction obeys Snell's law. But the reflection obeys a simple reflection law that the reflection angle is minus of the incidence angle. In the case of FIG. 9, $$\text{reflection angel is } 2\alpha, \quad (7)$$

and $$\text{refraction angle is } \theta = \sin^{-1}(n_1 \sin \alpha/n_a) - \alpha. \quad (8)$$

If the media are changed to other materials, the reflection angle is still $2\alpha$. The reflection angle is always $2\alpha$ irrespective of the media. If the reflection angle is larger than the full-reflection angle $\Psi$ ($2\alpha > \Psi$), the reflection light cannot be returning light. The reflection light is dissipated. This fact is true for any materials. Then, the slanting fiber end can inhibit the reflected light from returning to the LD.

On the contrary, the refraction angle $\theta$ is varied by the refractive index of the media. Fortunately, the refraction angle $\theta$ decreases nearly to zero, if the refractive index $n_a$ is close to the refractive index of the fiber. Despite the variation of $\alpha$, the refractive angle is nearly equal to zero ($\theta \approx 0$) in the case of the medium having the refractive index akin to the fiber. The nearly zero refractive angle enables the refracted beam to enter directly into the PD in the case of a PD module. The about zero refractive angle allows the incidence beam from an LD to enter into a fiber without inclination and to be a propagating beam in the fiber in the case of an LD module. The nearly zero refraction angle permits the passive alignment despite the slanting end cut.

Active alignment was indispensable for the prior art of FIG. 8 having the slanting fiber end 30. What requires the active alignment is nitrogen (or air; n=1.00) as a medium. In spite of the slanting fiber end 30, if the medium were a transparent resin having a refractive index akin to the fiber, the refraction angle would be nearly zero. The nearly zero refraction angle would be able to omit the active alignment. However, the fact proceeded otherwise. The skilled in art could not break down the sturdy belief of "slanting end= alignment indispensable" due to rich accumulation of technical knowledge.

A glance is taken at the advantages of the present invention. This invention solves the problem of the reflection returning light in a device including a fiber/waveguide and an optical device (PD, LD or so) by cutting the end of an optical fiber or a light waveguide and enclosing the fiber/waveguide, the optical device and a space between them with a transparent resin of a refractive index akin to the fiber/waveguide. The slanting end cutting and the transparent resin cooperate with each other to annihilate the reflection returning light perfectly without reducing the coupling coefficient. The present invention succeeds in decreasing the ORL far smaller than the prior art. Fabrication of devices requiring rigorous exclusion of the reflected returning light can make the best use of the present invention. A severer requirement will be imposed on the ORL in the future. This invention will be able to respond to the future request for the ORL. This invention is suitable for sophisticated devices treating with signals of ultrahigh frequency.

In spite of the slanting end, the present invention dispenses with the active alignment, since the transparent resin suppresses the refraction angle. The low refraction angle enables this invention to serve low cost optical devices by taking passive alignment (denial of the active alignment). This invention can be applied to making PLC devices. This invention is effective for miniaturizing the optical devices.

DETAILED DESCRIPTION OF THE PREFERRED EMBODIMENTS

[Embodiment 1 (Waveguide Type PD Module; 2 Degrees; Silicone-group Resin)]

Figure 1:
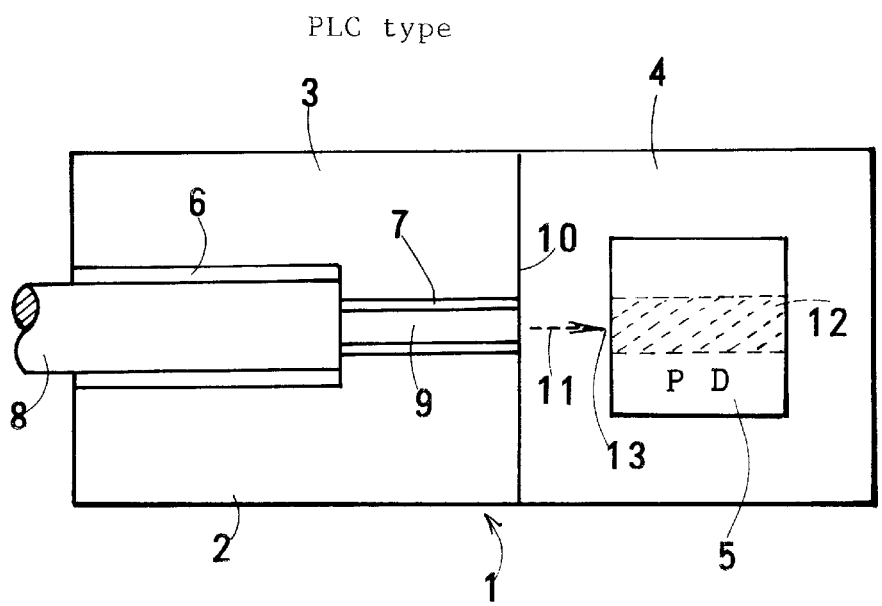
FIG. 1 is a plan view of a prior art PD module of the PLC type.
Figure 2:
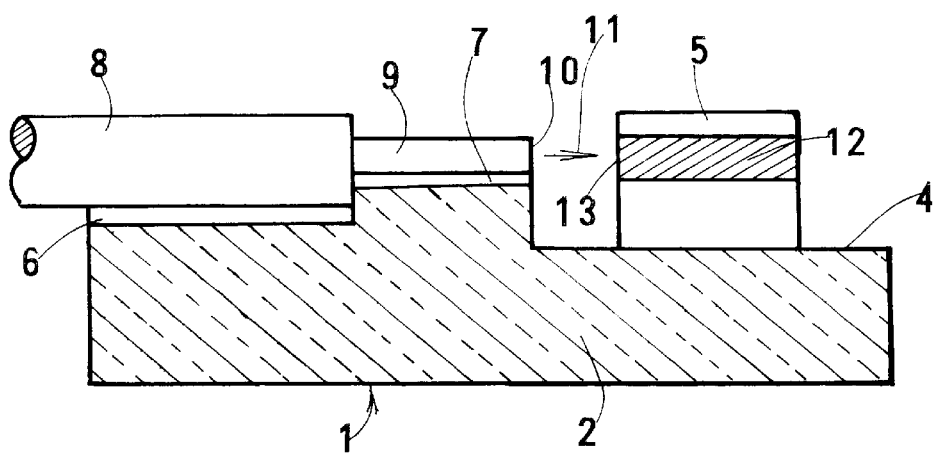
FIG. 2 is a vertical sectioned view of the same prior art PD module as FIG. 1.
Figure 3:
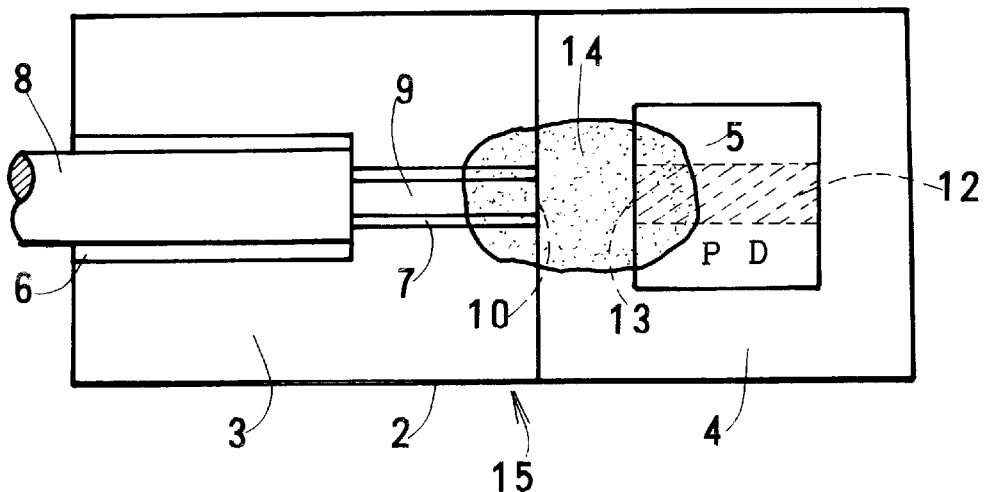
FIG. 3 is a plan view of a prior PD module coated with a transparent resin of the PLC type.
Figure 4:
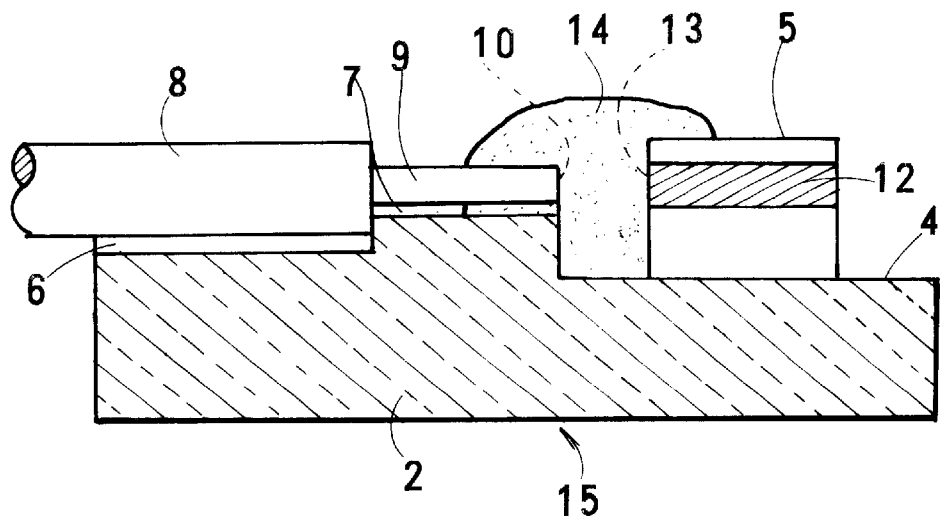
FIG. 4 is a vertical section view of the same prior art PD module as FIG. 3.
Figure 5:
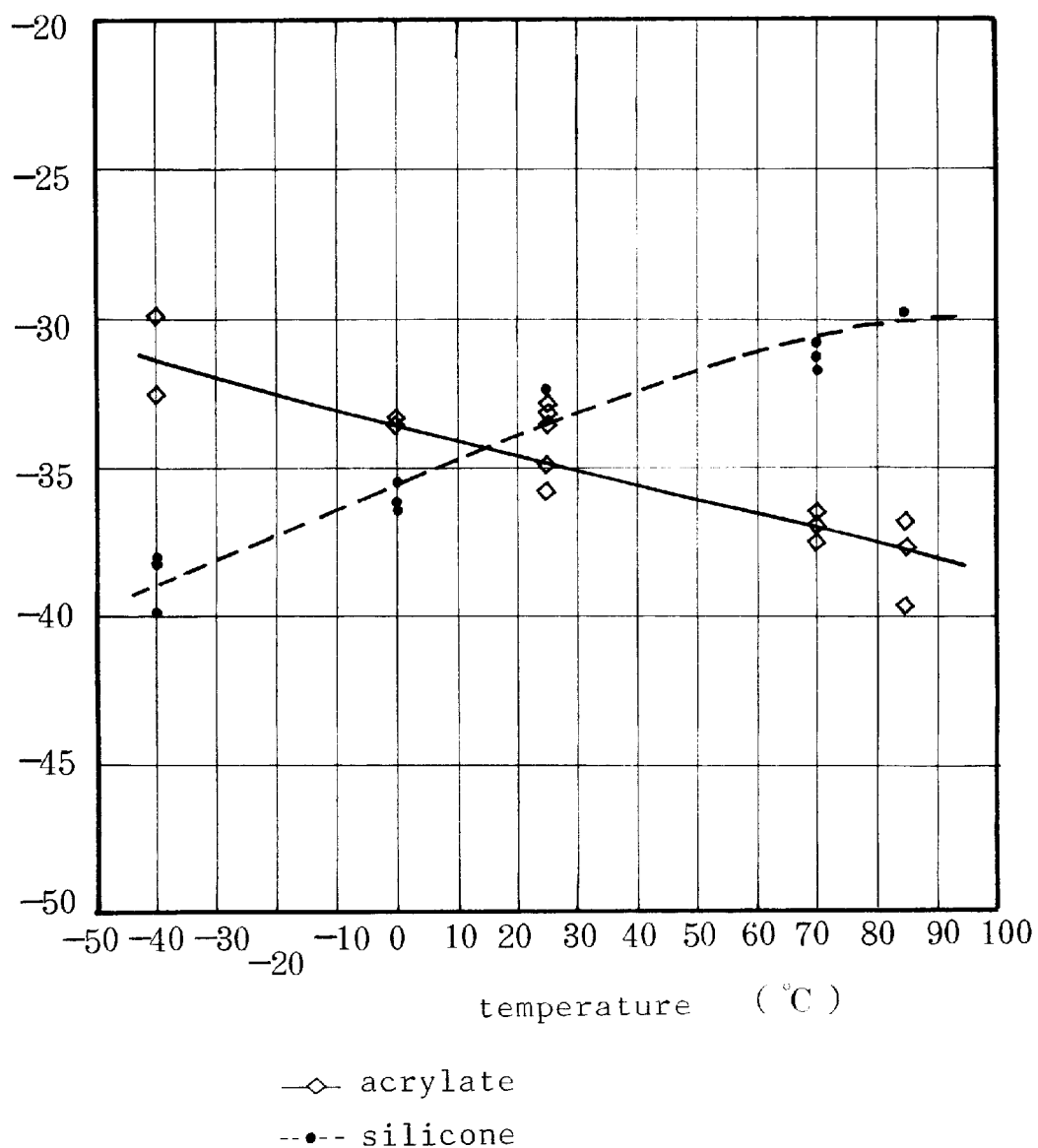
FIG. 5 is a graph of the temperature variation of the ORL of the PD modules of FIG. 3 and FIG. 4 with the gap filled with an acrylate-group resin or a silicone-group resin.
Figure 6:
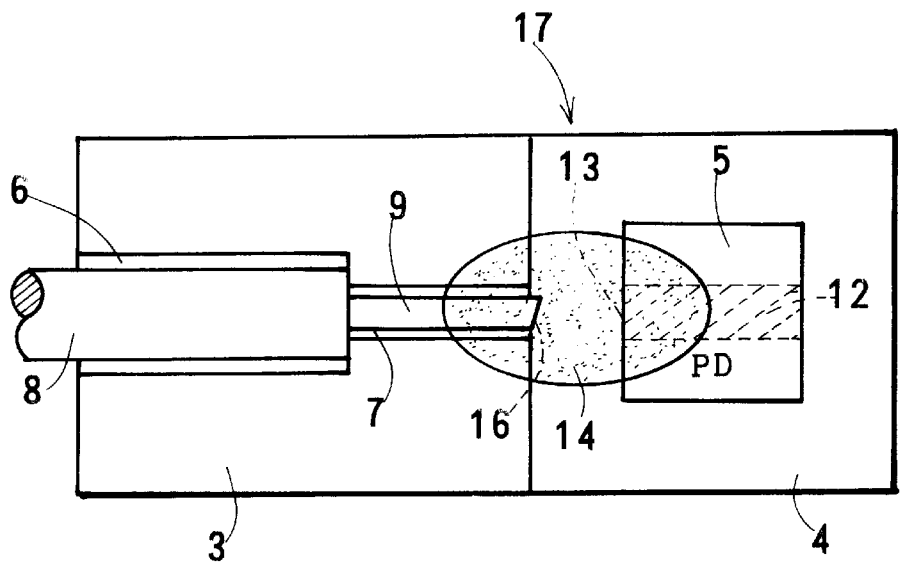
FIG. 6 is a plan view of a PD module as Embodiments 1 and 2 of the present invention.
Figure 7:
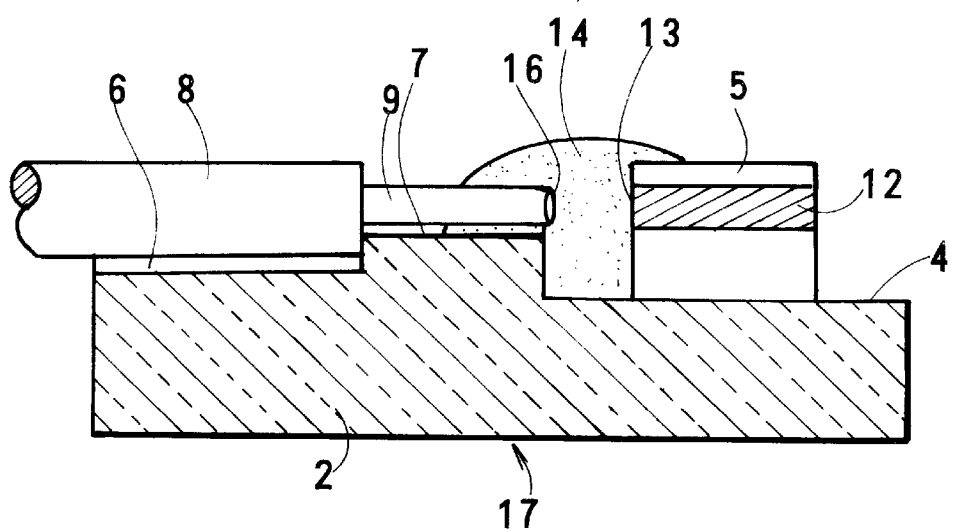
FIG. 7 is a vertically sectioned view of the same PD module as FIG. 6 (Embodiments 1 and 2).
Figure 8:
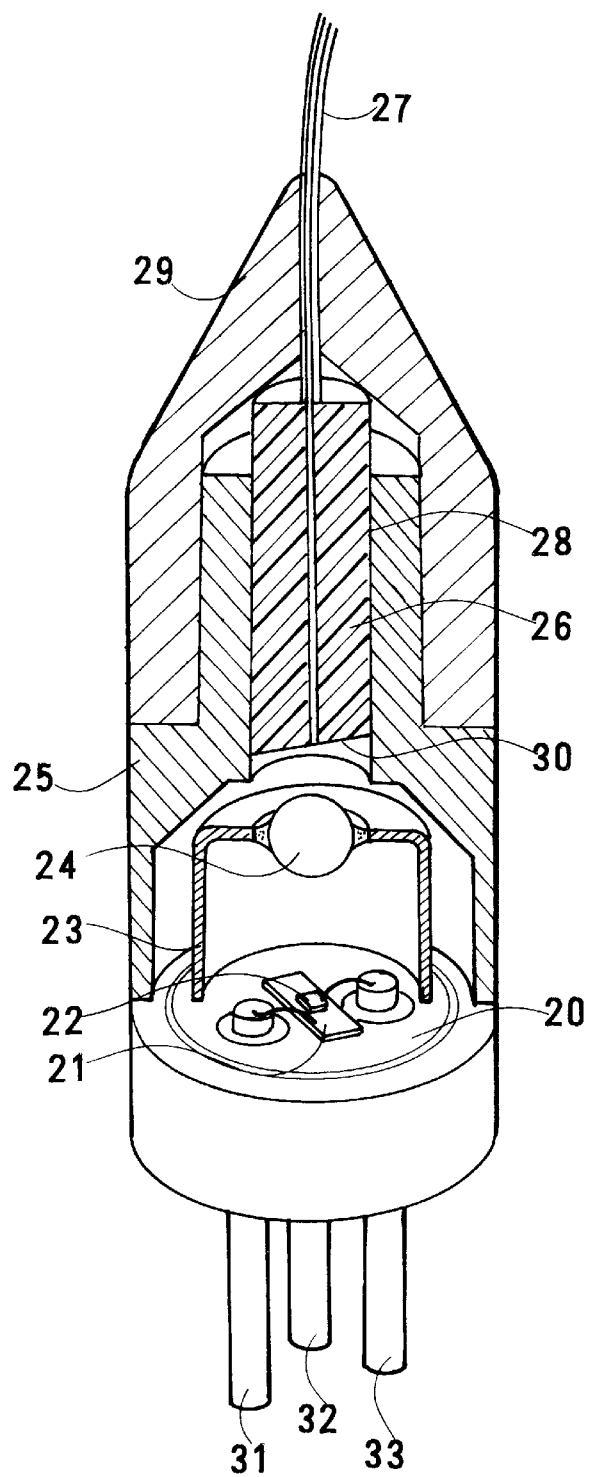
FIG. 8 is a vertically sectioned perspective view of a prior art axial symmetric PD module with a hermetically sealed metal package.

A PD module of FIG. 6 and FIG. 7 is fabricated in accordance with the teaching of the present invention. A silicon bench is prepared by anisotropically etching two kinds of V-grooves 6 and 7 and a lower step 4 on a silicon wafer, forming metallized patterns by lithography on a silicon wafer and scribing the silicon wafer lengthwise and crosswise into a plenty of unit benches. An individual silicon bench 2 has an upper step 3, a lower step 4, a larger V-groove 6 and a smaller V-groove 7. A fiber 9 is held by a cylindrical ferrule 8. An end 16 of the fiber 9 is cut obliquely. A PD chip 5 is fitted upon the lower step 4 of the silicon bench 2. The ferrule 8 is inserted into the bigger V-groove 6. The fiber 9 is inserted into the smaller V-groove 7. The ferrule 8 and the fiber 9 are fixed by an adhesive in the grooves 6 and 7. The slanting angle α is two degrees (α=2°). The fiber is a single-mode fiber for a 1.3 μm wavelength. The PD is a waveguide type PD having an InGaAs light receiving layer. A transparent silicone-group resin 14 is supplied to the gap between the oblique fiber end 16 and the PD 5 and is hardened by heating. The performance of the PD module is estimated by introducing light into the fiber from an LD. The measured ORL is −31 dB to −35 dB for the PD module. The sensitivity is 0.8 A/W. The sensitivity is similar to another PD module having a vertical cut fiber end coated with the silicone-group resin. But Embodiment 1 is superior to the vertical cut module in suppressing the ORL.

[Embodiment 2 (Waveguide Type PD Module; 4 Degrees; Acrylate-group Resin)]

Another PD module shown in FIG. 6 and FIG. 7 is produced. The structure is similar to Embodiment 1. A different point is the slanting angle of the fiber end. Here, Embodiment 2 has a slanting cut fiber end of 4 degrees. Namely, α=4 degrees. Another different point is the potting resin. A transparent acrylate-group resin is supplied between the PD and the fiber. the acrylate resin is hardened by heating. The ORL is −43 dB to −50 dB. Embodiment 2 is superior to Embodiment 1 in the ORL. The sensitivity is 0.8 A/W which is similar to Embodiment 1. The sensitivity is similar to another PD module having a vertical cut fiber end coated with the acrylate-group resin. But Embodiment 2 is superior in the ORL to the vertical end fiber module.

[Embodiment 3 (Bottom Surface Incidence Type PD Module)]

Figure 16:
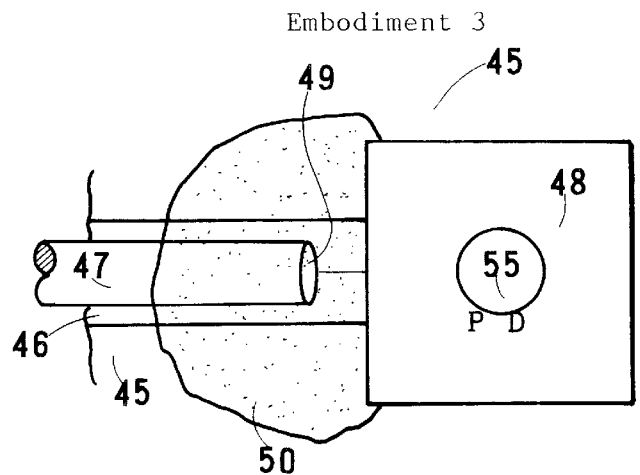
FIG. 16 is a plan view of a part of a PD module having a bottom incidence type PD chip as Embodiment 3.
Figure 17:
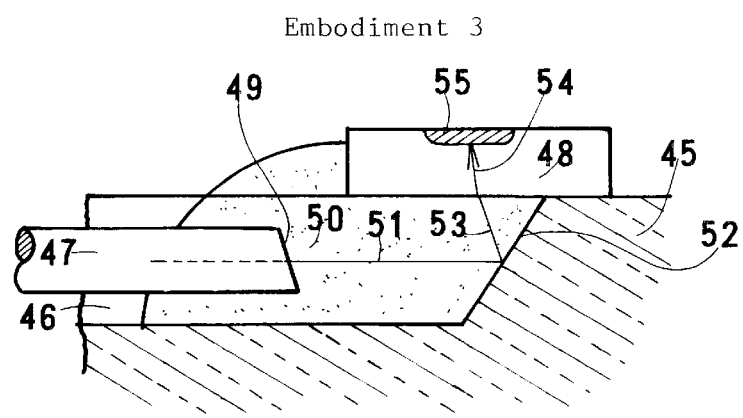
FIG. 17 is a vertically sectioned view of the same part of the PD module as FIG. 16 (Embodiment 3).

This invention can be applied to another type PD module making use of a bottom incidence type PD. FIG. 16 and FIG. 17 show Embodiment 3 of the bottom incidence type PD. A silicon bench 45 having a V-groove 46 is prepared by making V-grooves on a silicon wafer by anisotropic etching and cutting the silicon wafer into a plurality of small benches. An optical fiber 47 having a slanting end 49 is fixed in the V-groove 46. A bottom incidence type PD 48 is fixed above the end of the V-groove 46 upon the Si-bench (substrate) 45. The space between the fiber end 49 and the bottom of the PD 48 is filled with a transparent resin 50. The end of the V-groove 46 is shaped into an oblique mirror plane 52. Light 51 emanating from the fiber passes the transparent resin 50, shoots the oblique mirror plane 52 and turns upward into light 53. The upward light 53 enters the PD 48 via the bottom and is refracted at the interface into light 54. The light 54 reaches a light receiving region 55 and produces photocurrent.

Here, the fiber 47 is a single-mode fiber having an end cut obliquely at four degrees. The PD is a bottom incidence type PD having an InGaAs light receiving layer. The light receiving aperture is 100 μm in diameter. A silicone-group resin is supplied to the gap between the fiber and the PD and is hardened by heating. The measured ORL is −45 dB to −50 dB.

Unlike the above-mentioned waveguide type PD, the bottom incidence type PD has a wide aperture which brings about a wide tolerance for the incidence beam. The tolerance is about ±10 μm. The wide tolerance leads to high sensitivity. Although the fiber end is obliquely cut, the deviation of the spot is little on the light receiving surface of the PD. The sensitivity is nearly 0.9 A/W which is higher than the waveguide type PD module of Embodiment 1 or 2. The sensitivity is similar to a PD module having a vertically-cut fiber end covered with the silicone group transparent resin.

[Embodiment 4 (Top Incidence Type PD Module)]

Figure 18:
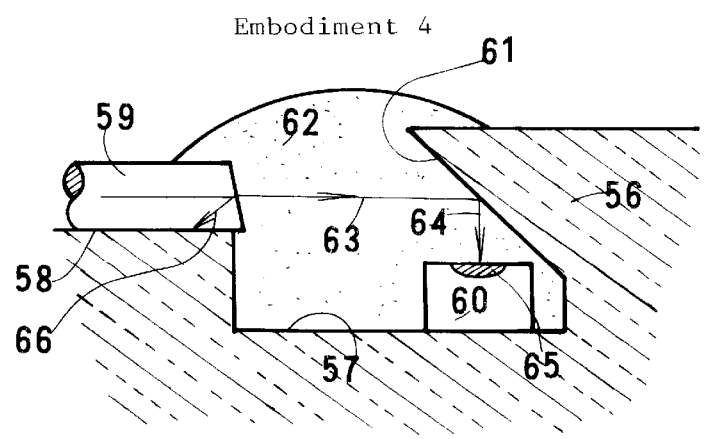
FIG. 18 is a vertically sectioned view of a part of a PD module including a top incidence type PD chip as Embodiment 4.

This invention can also be applied to a top incidence type PD module. FIG. 18 shows an example of a top incidence type PD module as Embodiment 4. A Si substrate 56 having a cavity 57 and a low step 58 is prepared. The wall of an end of the cavity is a downward slanting-wall 61. A fiber 59 having a slanting cut end is prepared. The fiber 59 is fitted upon the low step 58. A top incidence type PD 60 is fixed on the bottom of the cavity 57. A transparent resin 62 is replenished into the cavity 57 for covering the path between the fiber end and the PD 60. Light 63 going out of the fiber 59 makes its way to the slanting wall 61 and turns downward into light 64. The downward reflection beam 64 shoots a top 65 of the PD 60. The light yields photocurrent at the top light receiving region 65. Some of the propagating light is reflected backward into light 66 at the end surface of the fiber. The reflected beam 66 cannot be a propagating beam due to the inclination of the beam to the axis. The reflected light 66 is dissipated soon. The LD (not shown) is immune from the instability. Such an effect is similar to the bottom incidence type PD of Embodiment 3.

[Embodiment 5 (Side Incidence Type PD Module)]

Figure 19:
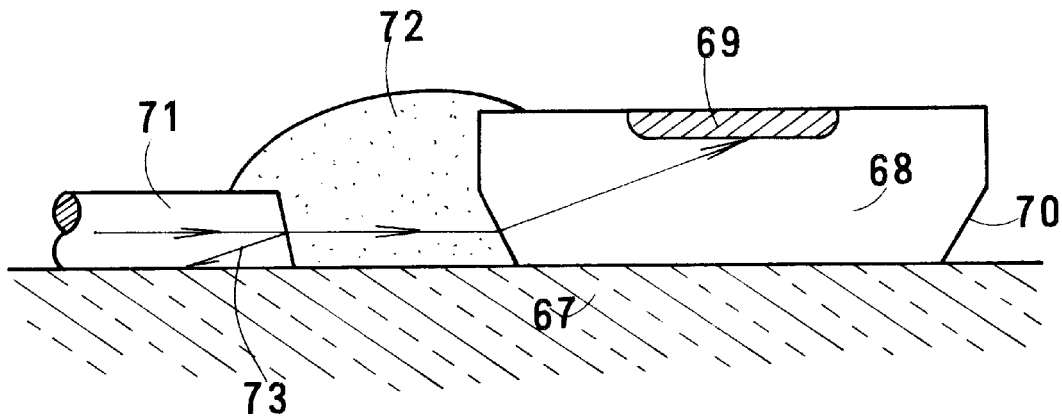
FIG. 19 is a vertically sectioned view of a part of a PD module having a side incidence type PD chip as Embodiment 5.

This invention can also be applied to a side incidence type PD module. Embodiment 5 is explained by referring to FIG. 19. A flat substrate 67 is prepared. A fiber 71 having a slanting cut end is prepared. The fiber 71 is fixed upon the substrate 67. A PD chip 68 having half slanting sides 70 is mounted upon the substrate 67. The PD 68 and the fiber 71 are laid upon the same level of the substrate 67. The intervening path between the PD 68 and the fiber 71 is filled with a transparent resin 72 (potting resin) having a refractive index similar to the fiber. Most of the propagating light goes out of the fiber 71. The light emanating from the fiber 71 progresses in the resin 72, reaches the slanting side of the PD 68 and turns upward in the PD 68 by the refraction. The light produces photocurrent in the PD 68. A part of the light is reflected at the end surface into a slanting beam 73. The slanting beam 73 has too large slanting angle to become a propagating beam. The reflected beam 73 goes out of the fiber 71. The effect of eliminating the reflection light is similar to Embodiment 3 of the bottom incidence type PD.

[Embodiment 6 (Prism Wavelength Division Multiplexer; WDM)]

Figure 20:
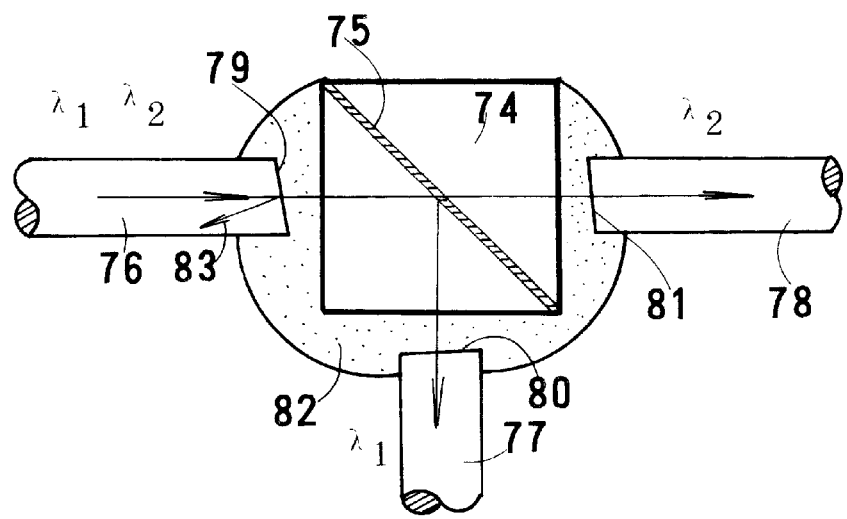
FIG. 20 is a plan view of a WDM including wavelength division prism as Embodiment 6.

This invention has various applications. In addition to the coupling to a PD or an LD, this invention is utilized to a coupling between an optical part and a fiber/waveguide. Embodiment 6 is an application to a WDM prism which is explained by referring to FIG. 20. A WDM (wavelength division multiplexer) 74 consists of two vertical, isosceles triangle sectioned prisms and a dielectric multilayer film 75 piled on the slanting plane of the prism. The dielectric multilayer film 75 has a selectivity of reflection and transparency contingent upon the wavelength. The shape is a square column. The WDM 74 is a square-sectioned column having four faces. Three fibers 76, 77 and 78 face to three surfaces of the column WDM 74.

The ends 79, 80 and 81 of the fibers are not orthogonal to the axis but slanting to the axis. A transparent (potting) resin 82 covers and protects the faces of the WDM 75 and the fiber ends. The resin 82 has a refractive index akin to the fibers. The dielectric multilayer 75 has the wavelength selectivity of reflection and penetration. λ1 light and λ2 light propagate in the fiber 76. The multilayer film 75 selectively reflects the λ1 light to the vertical direction. The λ1 light goes into the fiber 77. The dielectric multilayer 75 selectively allows the λ2 light to pass the WDM without loss. The λ2 light goes into the fiber 78 via the slanting end 81 with little bending. A part of the light is reflected at the oblique ends 79, 81 and 80. But each slanting end forbids the reflected light to return back in the fiber 76. The reflected light 83 vanishes soon. The light reflected at the slanting ends 81 and 80 does not go back to the fiber 76.

[Embodiment 7 (Antireflection Film)]

It is desirable to provide the surfaces of PDs or other optical parts with an antireflection film suitable for the wavelength of the signal light and the refractive index of the resin. The description hitherto has not referred to the antireflection film explicitly. But in general, PDs and other optical devices have antireflection films on the inlet surface. If the antireflection film protects the PD or other optical device, the reflection light at the surface of the PD or the other device is too weak to return back to the light source LD. Thus, the reflection on the surface of the PD or the device has been neglected in the explanation till now.

If an antireflection film were provided to the end surface of the fiber, the problem of the reflected returning light would vanish. However, it is very difficult to form an antireflection film on the end of the fiber. Thus, this invention tries to suppress the reflection returning light by the action of the transparent resin and the slanting end cutting.

[Embodiment 8 (LD Module)]

The invention has a feature of cutting an end of a fiber/waveguide slantingly, coupling the oblique cut end to an optical device and enclosing the slanting end part with a transparent resin. The PD modules have been explained till now. The invention can be applied to an LD module.

Figure 21:
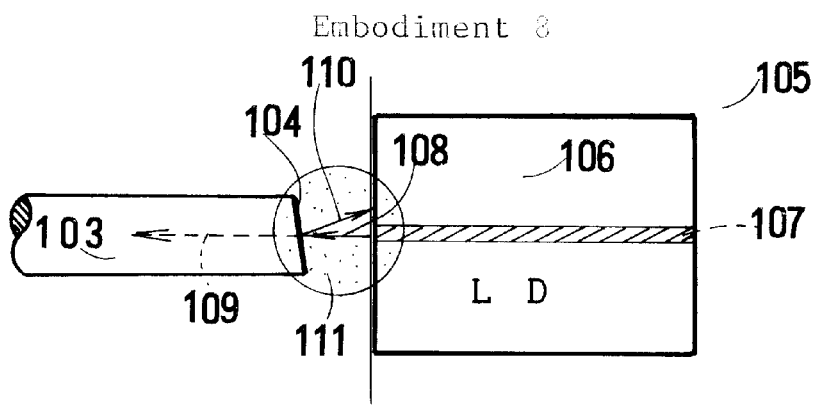
FIG. 21 is a plan view of an LD module including an LD, a slanting end fiber and a transparent resin covering the LD and the fiber end as Embodiment 8.
Figure 22:
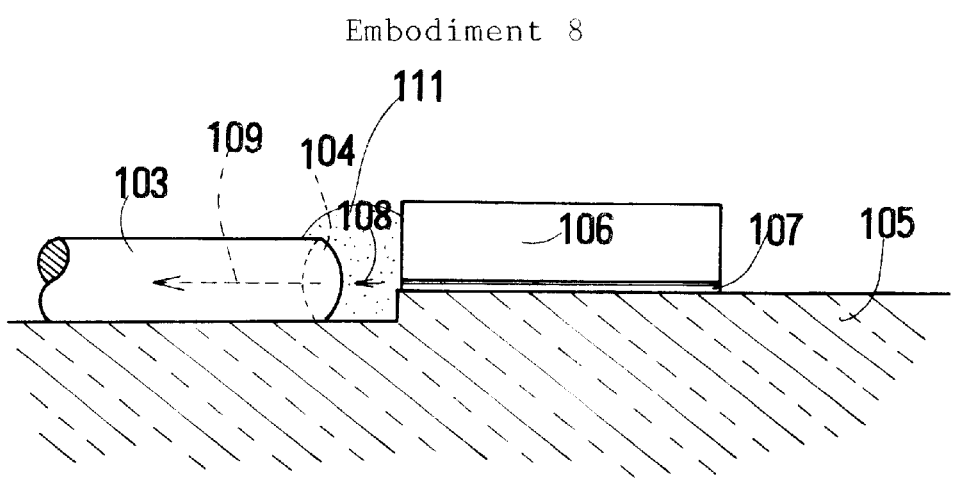
FIG. 22 is a sectioned view of the same LD module as FIG. 21 (Embodiment 8).

FIG. 21 and FIG. 22 show an LD module (Embodiment 8) made by the teaching of the present invention. An end 104 of a fiber 103 is cut obliquely. The fiber 103 is fixed upon a substrate 105. An LD 106 is upside down mounted upon the substrate 105. A transparent resin 111 is provided to the space between the fiber end 104 and the LD 106. LD light 108 is produced in a stripe 107 (light generating part) fabricated on the LD 106. The light 108 emitted from the LD 106 goes through the resin 111, enters into the fiber 103 and propagates in the fiber. The end of the fiber reflects a part of the LD light. A reflected beam 110 shoots slantingly at a point of the LD out of the stripe. The reflected light 110 does not return to the stripe 107 (light generating part). The LD 106 is an InP-type MQW-LD (multiquantum well LD). The length (L) is 300 μm, and the width (W) is 250 μm. The thickness (t) is 100 μm. The LD is made by piling an InGaAsP light generating part (stripe) on an InP substrate. The stripe 107 has a width of 1 μm and a thickness of 0.2 μm. The interval between the LD and the fiber end is determined to be about 20 μm to 70 μm.

Figure 12:
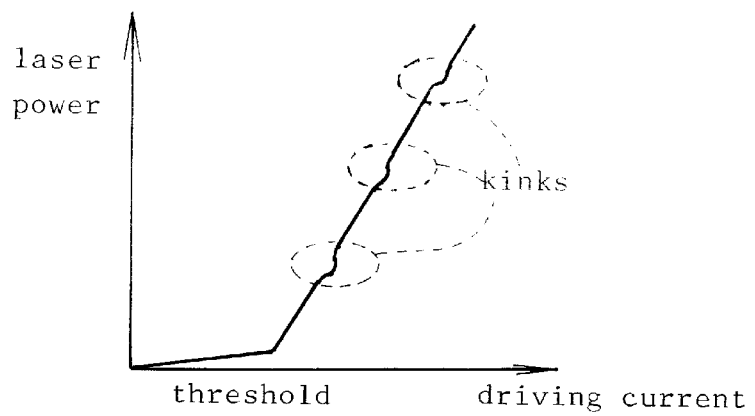
FIG. 12 is a graph of laser power as a function of the driving current for exhibiting kinks appearing in the curve due to the instability induced by the reflection returning light.
Figure 13:
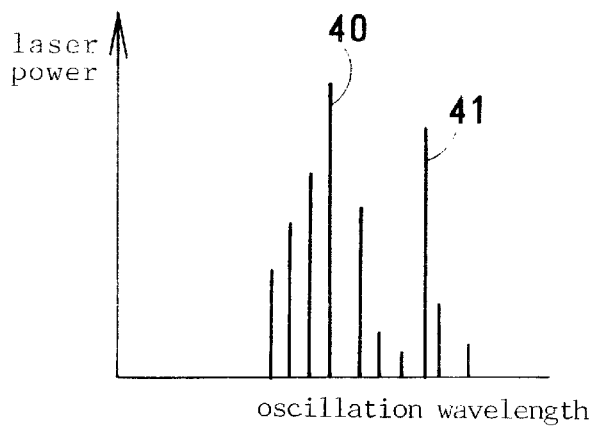
FIG. 13 is a spectrum of the laser power having a plurality of longitudinal modes which are changed by the reflection returning light.
Figure 14:
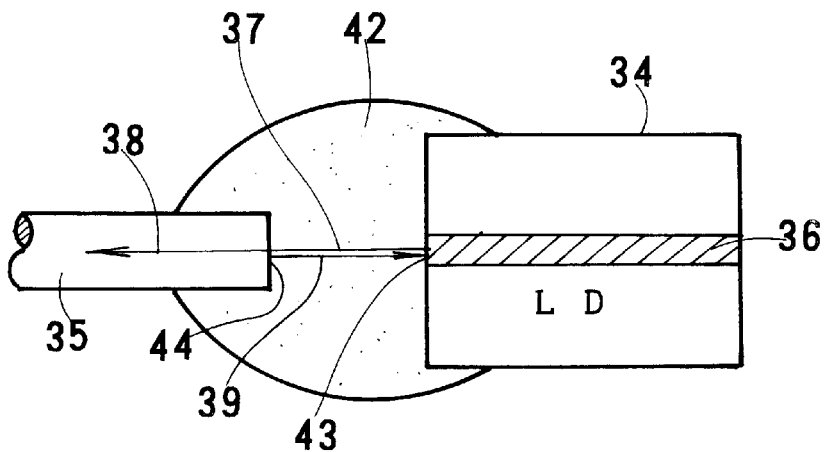
FIG. 14 is a sectional view of a prior art LD module having a transparent resin between the LD and the fiber for reducing the reflection.
Figure 15:
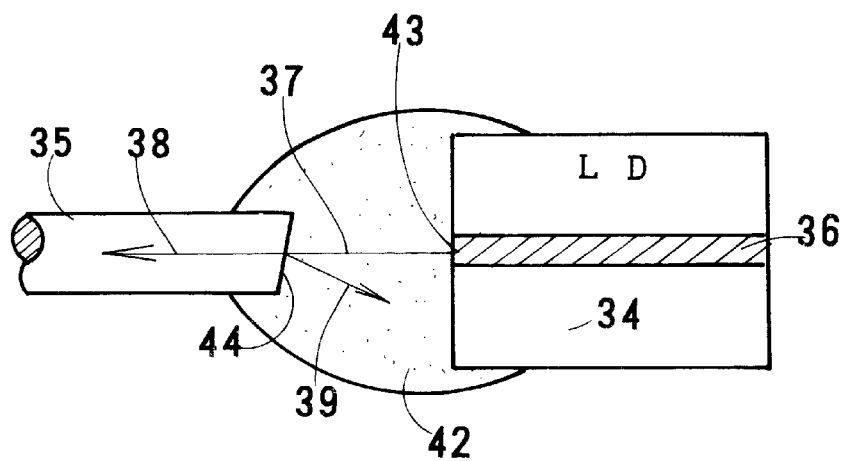
FIG. 15 is a sectional view of an LD module of the present invention having a slanting cut fiber end and a transparent resin for annihilating the reflection returning light.

The annihilation of the returning light excludes the irregularity between the driving current and the light power (FIG. 12) and the splitting of the spectrum (FIG. 13). Of course, the reflection of external light at the slanting fiber end is suppressed less than −40 dB.

The whole ORL measured by an external device is determined by the coupling efficiency between the LD and the fiber. Thus, in the case of the LD module, the present invention has rather a merit of annihilating the return of the reflected light to the LD perfectly. The invention makes the best use of two functions of the resin of reducing the reflection and the slanting end of diverting the reflection light.

No prior LD module has the assembly of the slanting end cut fiber and the transparent potting resin. The assembly of the slanting end and the potting resin is novel also in the case of LD modules. Why has such an assembly never been contrived by any persons? One reason is that they may suppose the resin would change the reflection angle and would cancel the effect of cutting the end slantingly. Another reason is that they may consider the resin would reduce the reflection angle as well as the refraction angle. A further reason is that they may think the reduction of the reflection by the resin would be sufficient. When the requested property for LD modules was low, either the resin or the slanting end would be enough to exclude the returning noise light. The present invention can perfectly exclude the reflection, returning light to the LD by assembling the slanting-cut end and the transparent potting resin.

There may be another anxiety for the skilled that a 4 degree to 8 degree cut end would change the fiber-introduced light into dissipation modes which do not propagate in the fiber. This may be a pitfall into which the skilled persons are likely to fall. The slanting end angle is not equal to the slanting angle of the beam going into the fiber. This is important to accept the idea of the present invention without suspicion.

Figure 9:
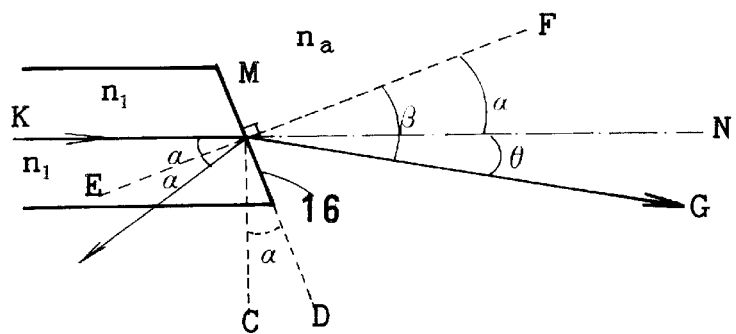
FIG. 9 is a side view of a slantingly end cut fiber for explaining the refraction and reflection of a beam propagating in the fiber at the end.
Figure 10:
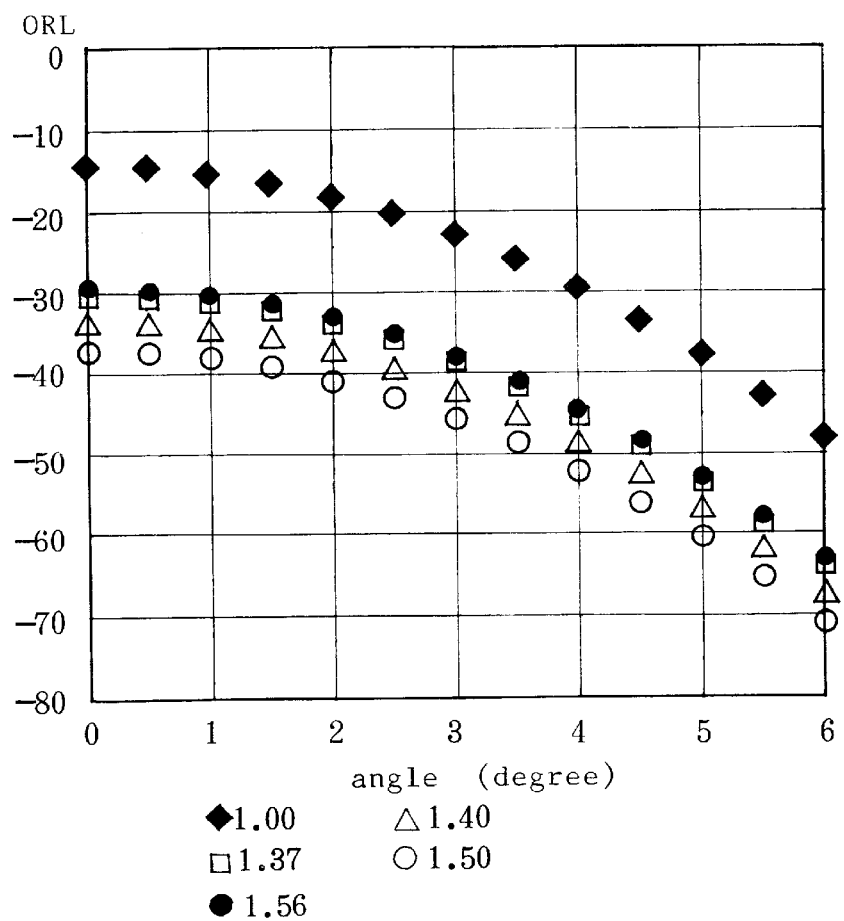
FIG. 10 is a graph showing the relation between the slanting cut angle and the ORL for medium refractive indexes $n_a$ as a parameter.
Figure 11:
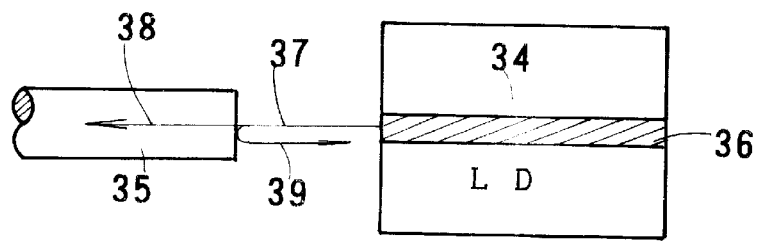
FIG. 11 is a plan view of a prior art LD module having a vertical fiber end.
Figure 23:
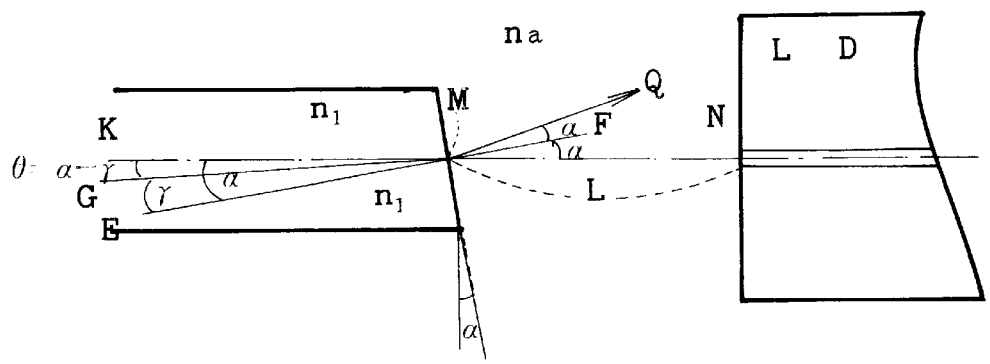
FIG. 23 is an enlarged section of the LD and the fiber enclosed with a transparent resin of a refractive index $n_a$ for clarifying the reflection and refraction of beams.

FIG. 23 shows the reflection and the refraction of beams near the fiber end. The figure resembles FIG. 9 but the directions of beams are reverse to FIG. 9. KMN is the axial line penetrating the centers of the fiber and the stripe. L is the distance between the fiber end and the front end of the LD. α is the slanting angle of the end surface of the fiber. The normal (vertical line) standing on the end is denoted by MF. An extension of the normal in the reverse direction is designated by ME. EMF is a straight line which inclines at α to the axial line KMN. The laser beam NM is refracted at the fiber end into MG. The refracted beam MG inclines at γ to the normal ME. The refracted beam MG inclines to the axis MK at θ. Since a sum of θ and γ is equal to α, $$\theta = \alpha - \gamma. \tag{9}$$

The reflected beam MQ inclines at 2α to the axial line MN. Snell's law determines the relation between the angles γ and α, $$n_1 \sin \gamma = n_a \sin \alpha. \tag{10}$$

The fiber refractive index is $n_1$ and the medium refractive index is $n_a$. $\gamma = \sin^{-1}(n_a \sin \alpha / n_1)$. From Eq.(9), $$\theta = \alpha - \sin^{-1}(n_a \sin \alpha / n_1). \tag{11}$$

$$\text{Reflected beam } MQ \;\angle NMQ = 2\alpha. \tag{12}$$

$$\text{Refracted beam } ME \;\angle KMG = \theta = \alpha - \sin^{-1}(n_a \sin \alpha / n_1). \tag{13}$$

Although the inclinations for both beams are invited by the slanting end cut α, there is conspicuous anisotropy between the reflection angle 2α and the refraction angle θ.

When the fiber has a four degree slanting end angle ($\alpha=4$ degrees), the reflection angle is 8 degrees ($2\alpha$) but the refraction angle $\theta$ is only 0.16 degree ($\theta=0.16°$). This is a very small angle which allows the refracted beam to be a propagating beam in the fiber ($0.16°<\Psi$). Therefore, the slanting end cutting does not reduce the coupling coefficient between the fiber and the LD.

Figure 36:
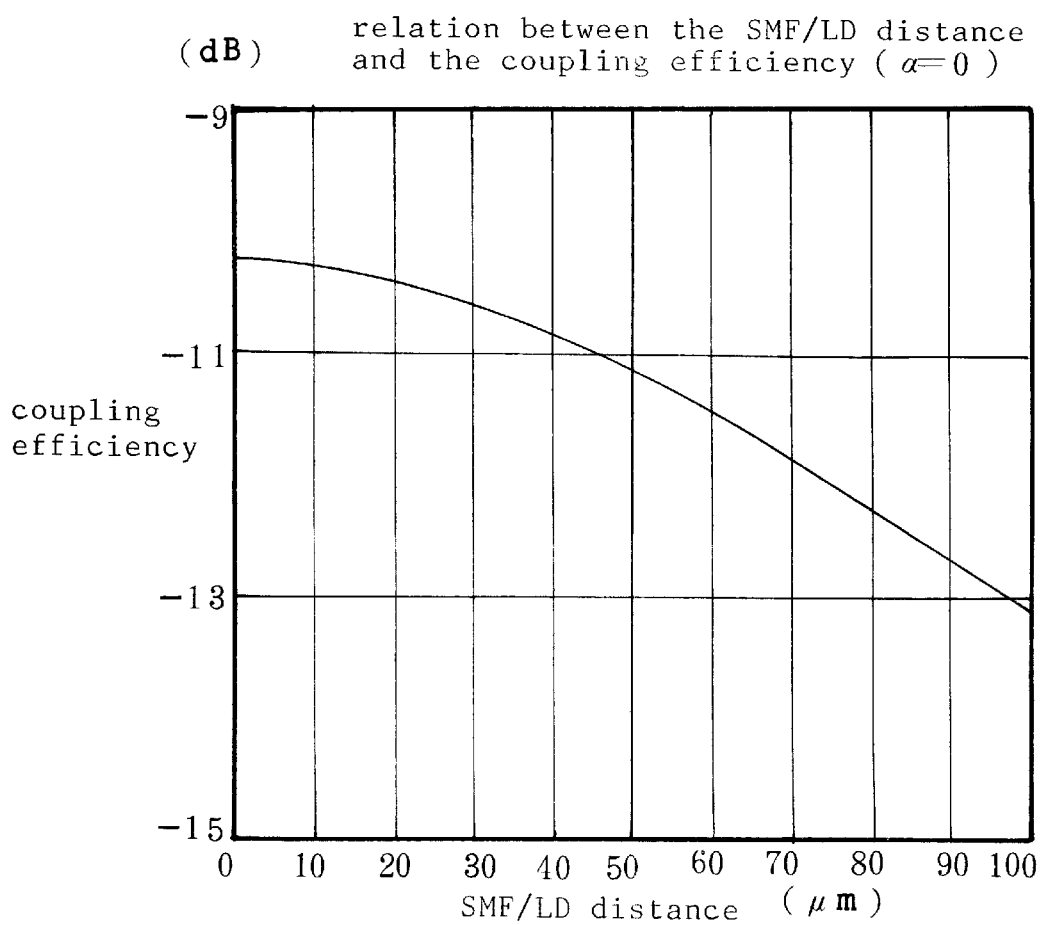
FIG. 36 is a graph showing the relation between the fiber/LD distance and the coupling efficiency for the zero slanting angle ($\alpha=0$) in the LD module.

Further the coupling coefficient is explained. FIG. 36 is a graph showing the coupling coefficient between the fiber and the LD as a function of the LD/fiber interval L ($\mu$m) in the case of the conventional vertical cut end fiber ($\alpha=0$). It is assumed that the fiber and the LD are enclosed by a transparent resin of $n_a=1.39$. The abscissa is the LD/fiber interval ($\mu$m). The ordinate is the coupling coefficient (dB). The coupling coefficient is $-11.2$ dB for L=50 $\mu$m. The coupling coefficient is $-13.1$ dB for L=100 $\mu$m. An increment of the interval reduces the coupling efficiency. It is a matter of course, since farther separation reduces the solid angle of the fiber core viewing from the LD.

Figure 37:
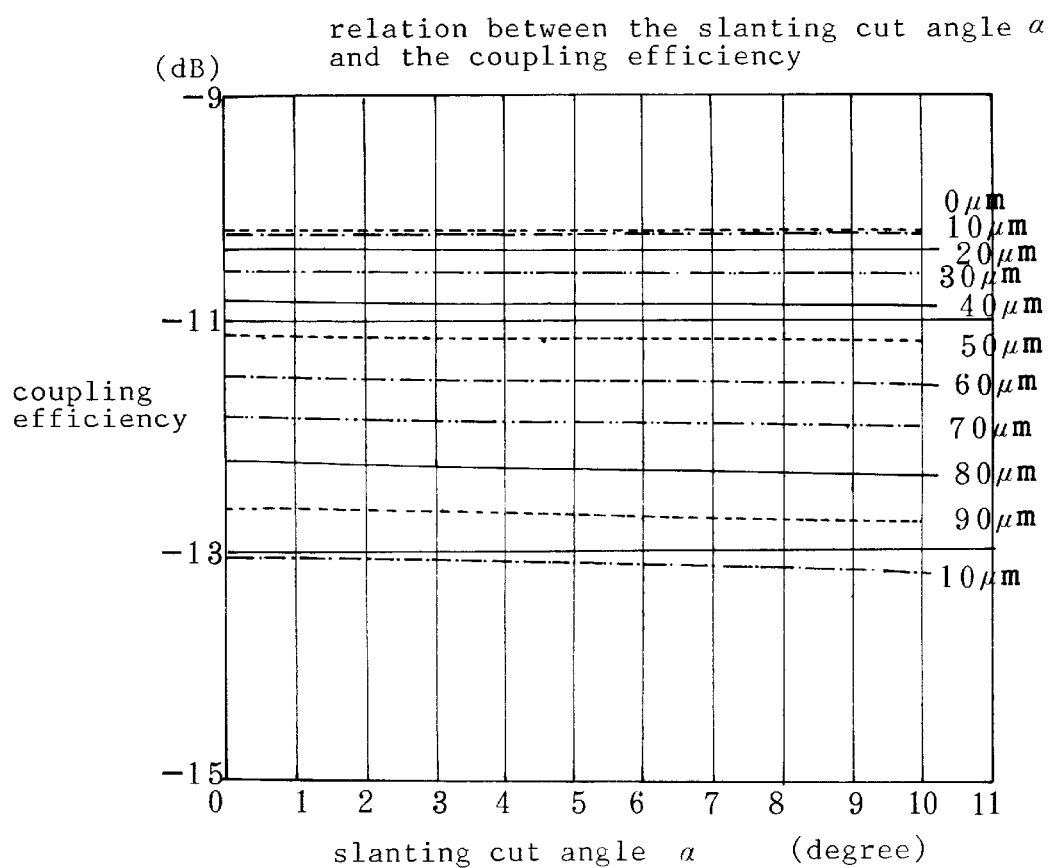
FIG. 37 is a graph showing the relation between the slanting cut angle $\alpha$ and the efficiency for various distances of 0 μm, 10 μm, 20 μm, 30 μm, 40 μm, 50 μm, 60 μm, 70 μm, 80 μm, 90 μm and 100 μm as a parameter in the LD module of the present invention.

FIG. 37 is a graph between the slanting end cut angle $\alpha$ and the coupling efficiency (dB) in the LD module of the present invention. The abscissa is the slanting cut angle $\alpha$ (degree). The ordinate is the coupling efficiency (dB). The interval which was the abscissa in FIG. 36 is now treated as a parameter which is shown at right sides of the curves in FIG. 37. The left side values on the vertical axis (efficiency axis) are the efficiency at $\alpha=0°$. FIG. 36 is regenerated from FIG. 37 by displacing the values at $\alpha=0°$ to the intervals denoted by the right hand numerals. The reason why the interval is the parameter is explained. The coupling efficiency is calculated as a function of $\alpha$ for every 10 $\mu$m increment of the interval L. In all the intervals L from 0 $\mu$m to 100 $\mu$m, the coupling efficiency decreases little despite the rise of $\alpha$. FIG. 37 selects $\alpha$ as an abscissa for showing nearly zero-decrease of the coupling efficiency despite the increase of $\alpha$. For example, the coupling efficiency is $-13.1$ dB for L=100 $\mu$m and $\alpha=0°$. The coupling efficiency is $-13.2$ dB for L=100 $\mu$m and $\alpha=10°$. Even if $\alpha$ is big, the efficiency does not fall so conspicuously.

The result was, in fact, beyond the imagination of the skilled. Most of the skilled have intuitively thought that the slanting fiber end cutting would raise the reflection, reduce the propagation light and decrease the coupling efficiency. Thus, nobody has tried such an attempt of cutting the fiber end slantingly in the PLC devices available to the passive alignment.

The transparent resin is the origin of the trick. The transparent resin reduces the reflection nearly to zero and decreases the change of the refraction angle. Almost all of the laser light can enter the fiber as propagation light due to little reflection. Further, the refraction angle $\theta$ is very small and the beam is scarcely bent by the refraction. The refraction angle $\theta$ is smaller than the full-reflection angle $\Psi$ ($\theta<\Psi$). The potting resin enhances the coupling efficiency by decreasing the reflection and by reducing the refraction angle $\theta$. The slanting end cut device can be proud of the high coupling efficiency obtained by the aid of the resin in contradiction to the expectation of the skilled.

[Embodiment 9 (Laser Diode (LD)+Light Waveguide)]

Figure 24:
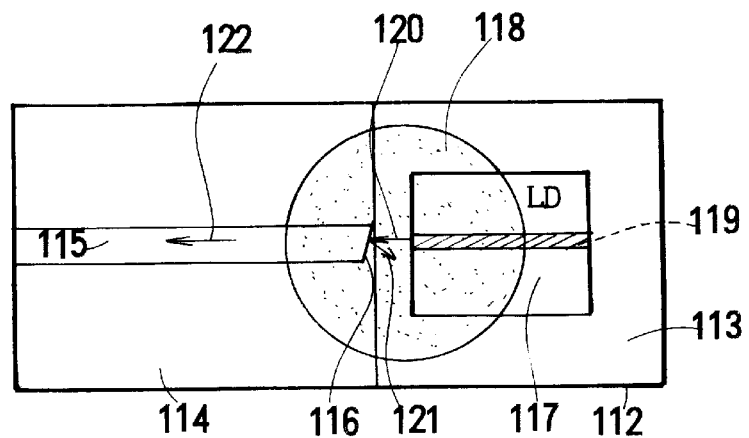
FIG. 24 is a plan view of an LD module of the PLC type having an oblique end fiber, an LD and a transparent resin protecting the gap between the LD and the fiber as Embodiment 9.
Figure 25:
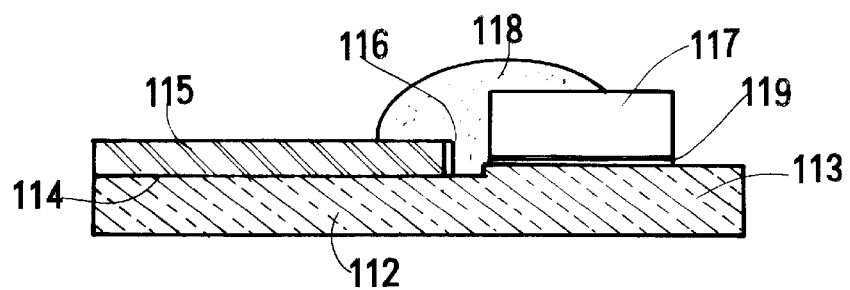
FIG. 25 is a sectional view of the same LD module as FIG. 24 (Embodiment 9).

The fiber can be replaced to a light waveguide formed on a planar substrate in the present invention. FIG. 24 and FIG. 25 show Embodiment 9 applied to an assembly of an LD and a light waveguide. Silicon benches 112 are prepared by making an upper step 113 and a lower step 114 by etching per unit area on a silicon wafer, making a light waveguide 115 on the lower step 112 per unit area by impurity doping, and scribing the wafer crosswise and lengthwise into individual chips (equal size to the unit area). The silicon bench 112 has the upper step 113, the lower step 114 and the longitudinal waveguide 115. The waveguide 115 is slantingly cut at a front end 116. The waveguides are fabricated by sputtering an $SiO_2$ buffer layer, a Ge-doped $SiO_2$ core layer and an $SiO_2$ cladding layer in turn on a silicon wafer (substrate), etching away the both sides of the $SiO_2$ cladding layer and the Ge—$SiO_2$ core layer except a middle narrow striped part, cutting slantingly the end of the waveguide and scribing the Si wafer into chips. An LD 117 is fixed upside down on the upper step 113. A stripe (light emitting part) 119 is in direct contact with the upper step 113. A transparent resin 118 is replenished to the gap between the waveguide and the LD 117. The potting resin 118 covers the waveguide end 116, the gap and the LD 117 for enclosing the light in the medium having a refractive index akin to the waveguide. The LD 117 emits light 120. The light passes the resin 118, enters the waveguide 115 and propagates in the waveguide 115. Small part of the light 120 emitted from the LD 117 is reflected at the end 116 of the waveguide 115. The slanting end forbids reflected light 121 to return to the stripe 119 of the LD 117. Immune from the returning light, the LD is endowed with the oscillation stability and the wavelength stability. The reflection loss is very small and almost all of the light can become propagating light 122.

[Embodiment 10 (Surface Emission Type LD or LED)]

Figure 26:
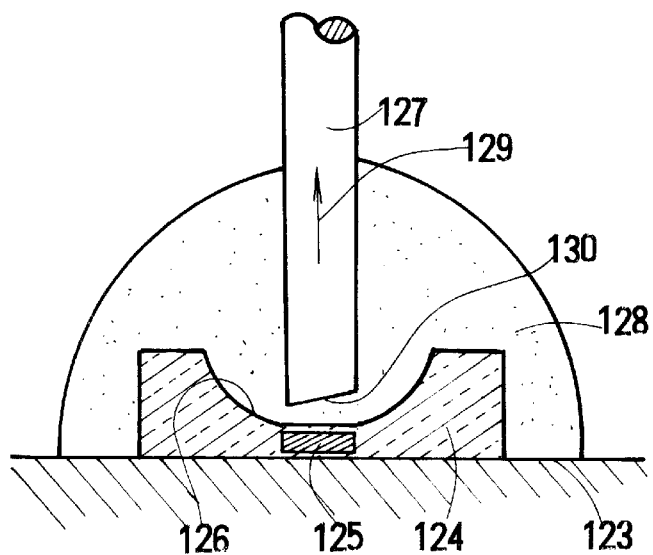
FIG. 26 is a sectional view of an LD or LED module having a slanting end fiber, a top emitting type LD or LED and a transparent resin enclosing the fiber end and the LD or LED as Embodiment 10.

The former embodiment relates to the end-emission type LD. This invention can also be applied to a surface emission type LD or a surface emission type LED. FIG. 26 denotes Embodiment 10 for a surface emission LD or LED. A flat substrate 123 is prepared. A surface emission type light emitting device 124 (LD or LED) is mounted upon the substrate 123. The light emitting device 124 has a cavity 126 and a light generating part 125 at the center. A fiber 127 is vertically maintained for facing the light generating part 125. An end 130 of the fiber 127 is polished obliquely. The end 130 of the fiber, the light emitting device 124 are enclosed by a transparent resin 128 having a refractive index which is nearly equal to the fiber. The light emanating from the device 124 goes into the fiber 127 via the slanting end 130. Little part of the light is reflected at the end 130. The reflected light does not return the light generating part 125 due to the slanting reflection. The LD or the LED is immune from the reflection light.

[Embodiment 11 (Surface Emission Type LD or LED with Lens)]]

Figure 27:
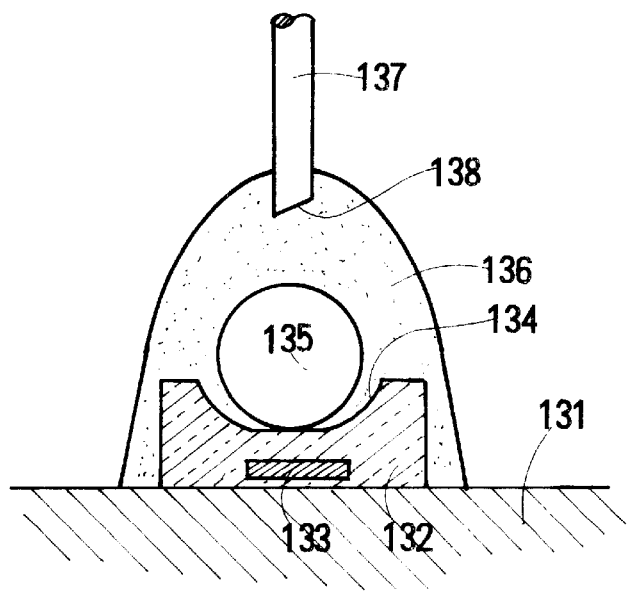
FIG. 27 is a sectional view of an LD or LED module having a slanting end fiber, a top emitting type LD or LED, a lens and a transparent resin enclosing the fiber end, the lens and the LD or LED as Embodiment 11.
Figure 28:
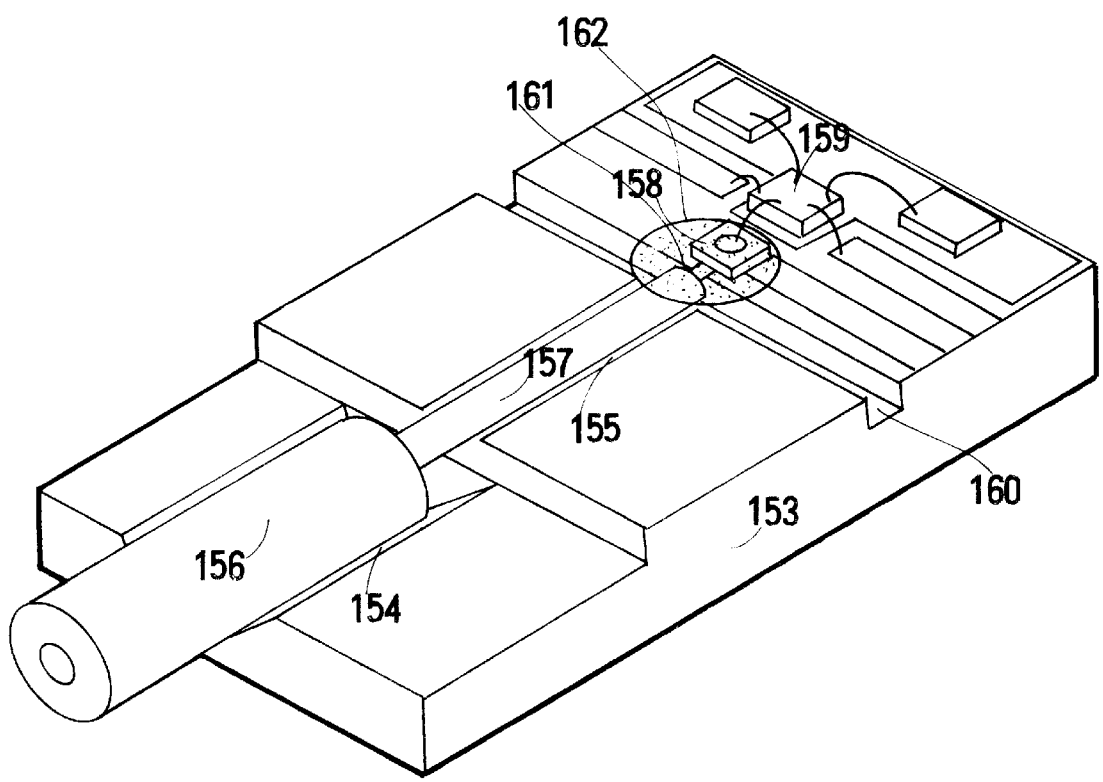
FIG. 28 is a perspective view of a PD module having a silicon bench with V-grooves, a ferrule, a fiber, a PD, an AMP and capacitors mounted on the silicon bench as Embodiment 12.

FIG. 27 shows another application to a surface emission type light emitting device. A surface emission type light emitting device 132 is mounted upon a substrate 131. The device 132 has a top cavity 134 for reducing the absorption of the light by other layers. A lens 135 is placed upon the top cavity 134. A fiber 137 is vertically supported above the lens 135. An end 138 of the fiber 137 is polished slantingly. A transparent resin 136 is replenished into the cavity for covering the device 132, the lens 135 and the end 138 of the fiber 137 for abating and inclining the reflection by the action of a similar refractive index to the fiber and the slanting end. The lens enhances the coupling coefficient by converging the light from the device 132 to the fiber core.

[Embodiment 12 (PIN-AMP Module)]

Figure 29:
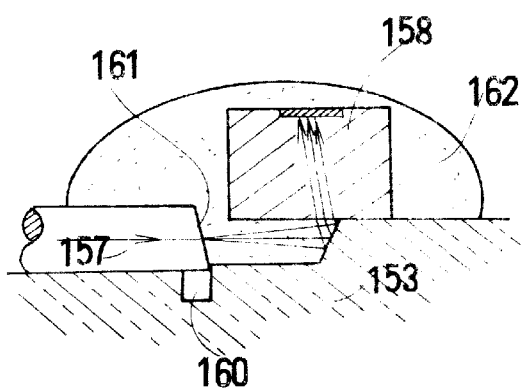
FIG. 29 is a sectional view of a part of the fiber end and the PD in the PD module of Embodiment 12 shown in FIG. 28.
Figure 30:
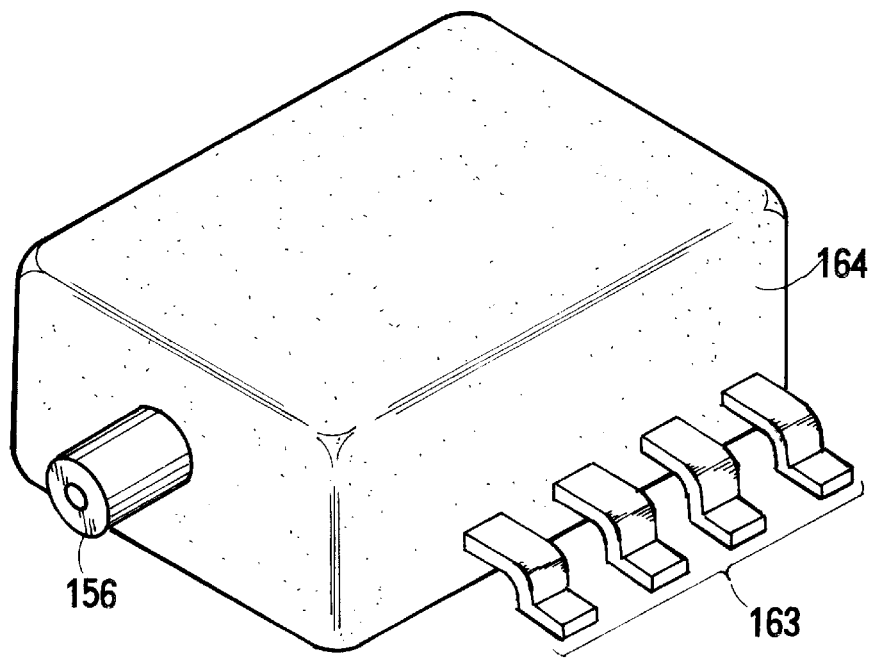
FIG. 30 is a perspective view of the assembled PD module in a resin molded package of Embodiment 12 shown in FIG. 28.
Figure 31:
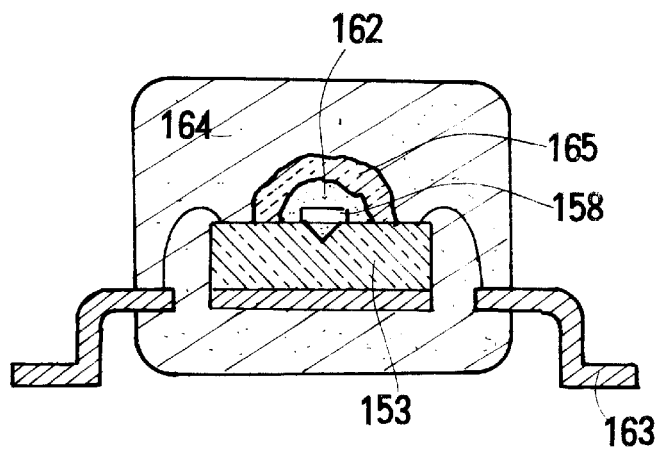
FIG. 31 is a traverse section of the PD module sectioned before the PD of Embodiment 12.
Figure 32:
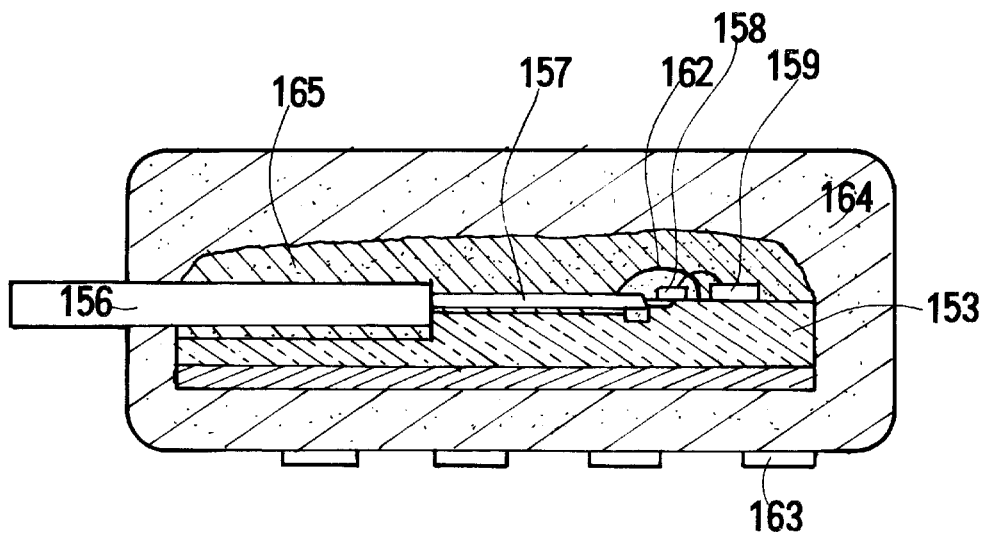
FIG. 32 is a longitudinal section of the PD module of Embodiment 12.
Figure 33:
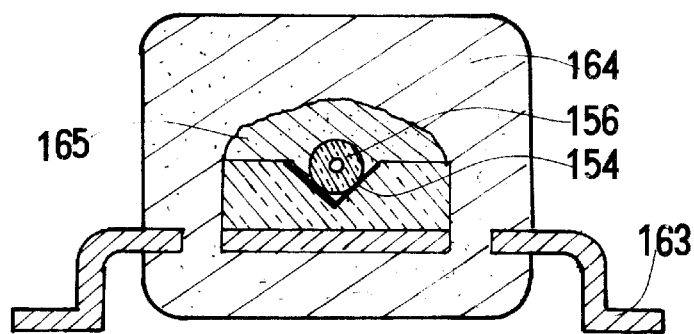
FIG. 33 is another traverse section of the same PD module at the ferrule of Embodiment 12.

Embodiment 12 is an application to a PIN-AMP module. Here, PIN means a photodiode having a p-i-n layer structure. AMP signifies an amplifier for amplifying the PD signal. FIG. 28 to FIG. 33 show Embodiment 12 of a PIN-AMP type PD module. Silicon benches 153 are prepared by making a plurality of steps and V-grooves per unit area on a silicon wafer by photolithography and etching, forming metallized patterns by evaporation, sputtering or etching, and scribing the silicon wafer into unit chips. The silicon bench 153 has a larger V-groove 154, a smaller V-groove 155 in the longitudinal direction and a partition groove 160 in the vertical direction. A fiber 157 is inserted and fixed in a cylindrical ferrule 156. A free end 161 of the fiber 157 is cut slantingly. The ferrule 156 and the fiber 157 are fitted upon the larger V-groove 154 and the smaller V-groove 155 respectively. The slanting surface can be directed in any orientation around the axis. A bottom incidence type PD 158 is fitted on a metallized pattern of the substrate 153 in front of the fiber 157. A preamplifier (AMP) 159 is mounted on a metallized pattern of the substrate 153, following the PD 158. Chip capacitors are bonded upon the metallized pattern. The electrodes of the devices and the metallized patterns are connected by wirebonding. The metallized patterns are connected with lead frames by wirebonding. The vertical groove 160 determines the position of the fiber end (FIG. 29). The fiber end 161, the PD 158 and the groove below the PD are covered with a transparent potting resin 162. The potting resin 162, the other part of the fiber 157 and the substrate are protected by an epoxy-group resin 165 which excels in rigidity and shielding performance. The epoxy-coated substrate and lead frame are enclosed and packaged by a plastic molding resin 164. FIG. 30 shows the completed PD module in the plastic-molding package 164. Lead pins 163 and the ferrule 156 project from the package 164. The ferrule 156 is an inlet of light signal. As shown in FIG. 29, the light emitted from the fiber 157 is reflected upward by the mirror end of the groove, and is introduced into the PD 158 via the bottom. The light induces photocurrent. The slanting end 161 forbids the reflection light to be a propagation beam.

[Embodiment 13 (A Plurality of Fibers, A Plurality of AMP-PDs)]

Figure 34:
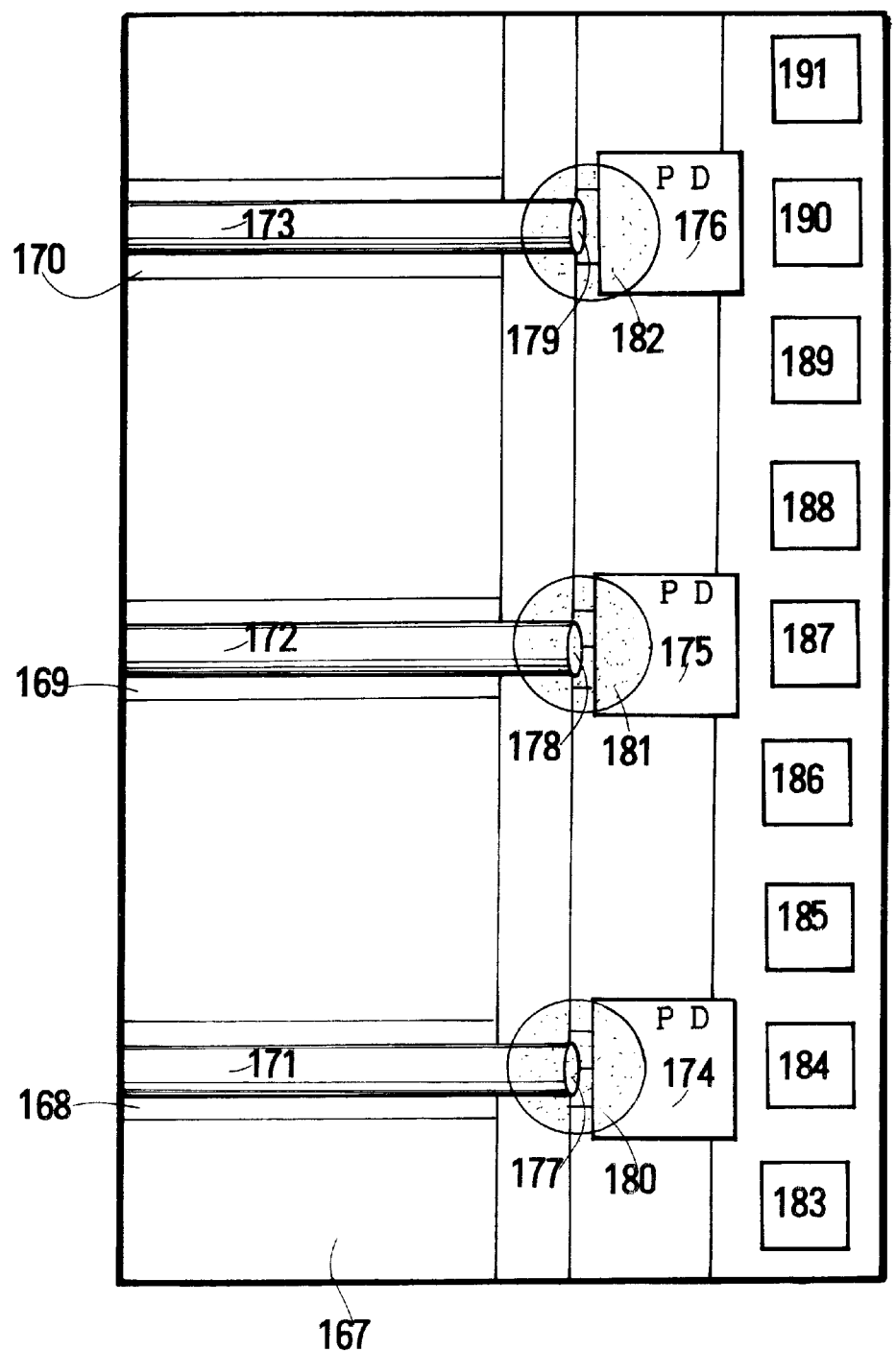
FIG. 34 is a plan view of a PD module including a plurality of fibers and the same number of PDs facing the fibers as Embodiment 13.

This invention can be applied also to a complex PD module including a plurality of fibers, a plurality of PDs and AMPs. FIG. 34 shows a plan view of the complex PD module. A substrate 167 having a plurality of parallel V-grooves 168 to 170 with oblique ends is prepared. A plurality of fibers 171 to 173 having slanting ends are inserted and glued upon the V-grooves 168 to 170. The orientations of the slanting edges are arbitrary. Bottom incidence type PDs 174 to 176 are mounted above the ends of the V-grooves 168 to 170 upon the substrate 167. AMPs 184, 187 and 190 are mounted upon the bench 167 for amplifying the signals of the PDs. Other devices 183, 185, 186, 188, 189 and 191 are mounted on the bench for processing the signals. Transparent resins 180 to 182 cover the fiber ends, the PDs and the grooves between the PDs and the fibers. Sets of a fiber, a PD, an AMP and a processor are independent from each other.

[Embodiment 14 (A Plurality of Fibers, PD Array and AMP)]

Figure 35:
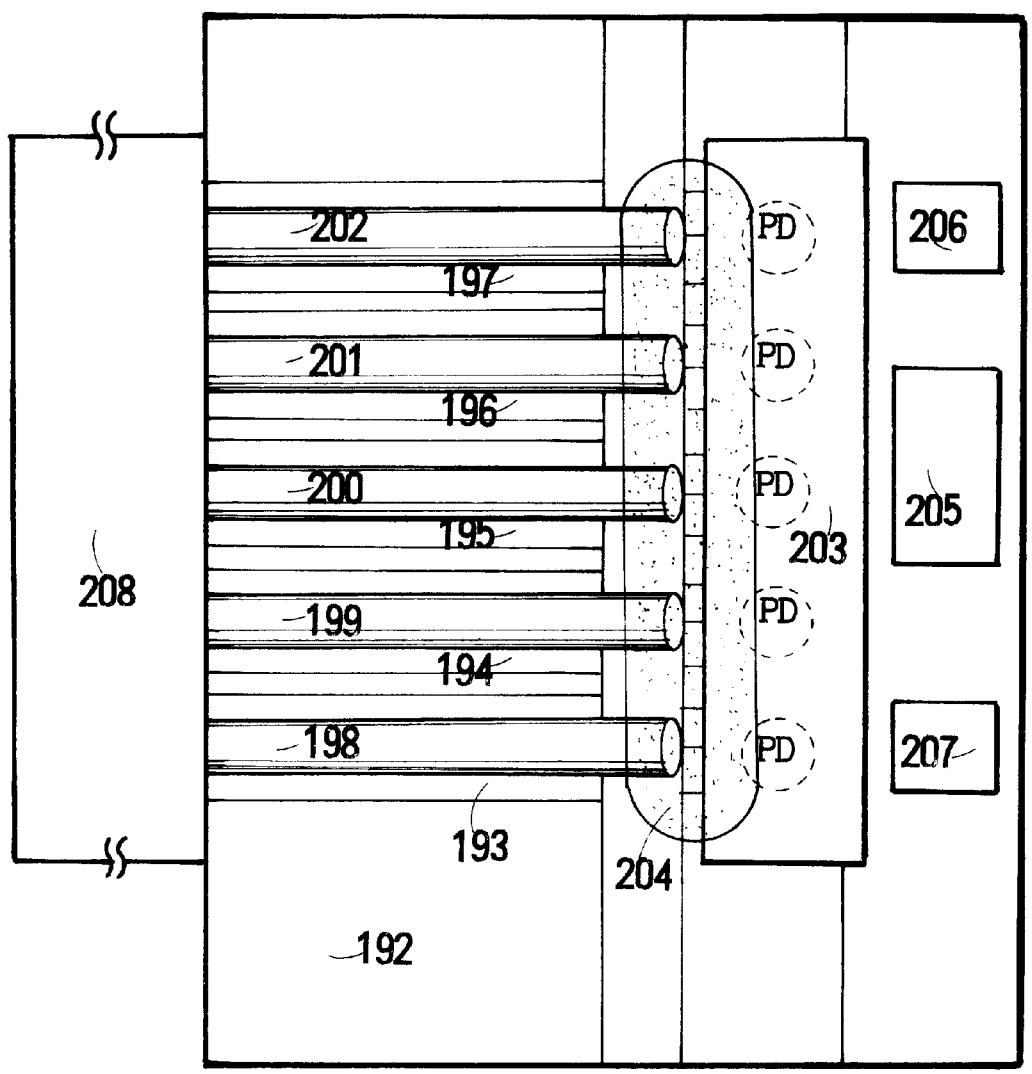
FIG. 35 is a plan view of a PD module including a plurality of fibers and a PD array including the same number of PD chips as Embodiment 14.

This invention can be applied also to a complex PD module including a plurality of fibers and a PD array. FIG. 35 shows a plan view of the complex PD module. A substrate 192 having a plurality of parallel V-grooves 193 to 197 with oblique ends is prepared. The substrate has metallized patterns for electric wiring (not shown in the figure). A plurality of fibers 198 to 202 having slanting ends are prepared. The fibers 198 to 202 are fitted into the V-grooves. A PD array 203 is a device having a plurality of bottom incidence type PD chips. The PD array 203 is mounted above the ends of the grooves upon the substrate 192. An AMP 205 and other signal processing devices 206 and 207 are furnished upon the substrate 192. A transparent potting resin covers the fiber ends, the grooves and the PD array.

We claim:

1. An optical device comprising:

a first optical part having an optical axis and an end for transmitting light, the end being slanting to the optical axis at a slanting angle α;

a second optical part facing the first optical part for exchanging light with the first optical part; and a transparent resin having a refractive index akin to the first optical part for covering the end of the first optical part, the second optical part and a space between the first optical part and the second optical part, wherein the first optical part is a ferrule holding an optical fiber having a slanting end of an angle of two degrees to eight degrees, the ferrule is fixed in a V-groove on a silicon bench or a ceramic substrate, the second optical part is a light emitting device of an LD or an LED fixed upon the silicon bench or the ceramic substrate, the transparent resin enclosing the space between the first optical part and the second optical part is one of silicone-group resins or acrylate-group resins, and an opaque resin covers the transparent resin, the first optical part and the second optical part, and the substrate.

2. An optical device comprising:

a first optical part having an optical axis and an end for transmitting light, the end being slanting to the optical axis at a slanting angle α;

a second optical part facing the first optical part for exchanging light with the first optical part; and a transparent resin having a refractive index akin to the first optical part for covering the end of the first optical part, the second optical part and a space between the first optical part and the second optical part, wherein the first optical part is a ferrule holding an optical fiber having a slanting end of an angle of two degrees to eight degrees, the ferrule is fixed in a V-groove on a silicon bench or a ceramic substrate, the second optical part is a photodetecting device of a PD, an APD or an AMP-PD fixed upon the silicon bench or the ceramic substrate, the transparent resin enclosing the space between the first optical part and the second optical part is one of silicone-group resins or acrylate-group resins, and an opaque resin covers the transparent resin, the first optical part and the second optical part, and the substrate.

3. An optical device comprising:

a first optical part having an optical axis and an end for transmitting light, the end being slanting to the optical axis at a slanting angle α;

a second optical part facing the first optical part for exchanging light with the first optical part; and a transparent resin having a refractive index akin to the first optical part for covering the end of the first optical part, the second optical part and a space between the first optical part and the second optical part, wherein the first optical part is a ferrule holding an optical fiber having a slanting end of an angle of two degrees to eight degrees, the ferrule is fixed in a V-groove on a silicon bench or a ceramic substrate, the second optical part is a set of a light emitting devices of an LD or an LED and a photodetecting device of a PD, an APD or an AMP-PD fixed upon the silicon bench or the ceramic substrate, the transparent resin enclosing the space between the first optical part and the second optical part is one of silicone-group resins or acrylate-group resins, and an opaque resin covers the transparent resin, the first optical part and the second optical part, and the substrate.

4. An optical device comprising:

a first optical part having an optical axis and an end for transmitting light, the end being slanting to the optical axis at a slanting angle $\alpha$;

a second optical part facing the first optical part for exchanging light with the first optical part; and a transparent resin having a refractive index akin to the first optical part for covering the end of the first optical part, the second optical part and a space between the first optical part and the second optical part, wherein the first optical part is a plurality of optical fibers having slanting ends of an angle of two to eight degrees, the second optical part is a plurality of light emitting devices of LDs or LEDs, a plurality of photodetecting devices of PDs, APDs, or AMP-PDs, or a plurality of sets of the light emitting devices of LDs or LEDs and the photodetecting devices of PDs, APDs, or AMP-PDs facing the optical fibers and being fixed upon the silicon bench or the ceramic substrate, the transparent resin enclosing the space between the first optical part and the second optical part is one of silicone-group resins or acrylate-group resins, and an opaque resin covers the transparent resin, the first optical part and the second optical part and the substrate.

* * * * *